United States Patent [19]
Akutsu et al.

[11] Patent Number: 5,870,248
[45] Date of Patent: Feb. 9, 1999

[54] FRAME FOR FLEXIBLE DISK DRIVE UNIT HAVING DISTORTION PREVENTION HOLE AND 2 RIBS FORMED AROUND MOTOR ATTACHING HOLE

[75] Inventors: Satoru Akutsu; Kazuya Oda; Katsumi Kurita; Hideto Nishimura; Koichi Okubo; Hiroshi Ito; Yukio Izumi; Hidetada Nagaoka; Keiichi Nishikawa; Atsuo Onoda; Yuji Ohmura, all of Tokyo, Japan

[73] Assignee: Mitsubishi Denki Kabushiki Kaisha, Tokyo, Japan

[21] Appl. No.: 957,312

[22] Filed: Oct. 23, 1997

Related U.S. Application Data

[63] Continuation of Ser. No. 525,334, Sep. 7, 1995.

[30] Foreign Application Priority Data

Sep. 14, 1994 [JP] Japan .................................. 6-220586
Sep. 14, 1994 [JP] Japan .................................. 6-320364

[51] Int. Cl.⁶ ........................................................ G11B 33/12
[52] U.S. Cl. ................................................................ 360/99.04
[58] Field of Search ........................... 360/97.02, 97.01, 360/99.04, 98.07, 99.08; 29/603.01–603.03

[56] References Cited

U.S. PATENT DOCUMENTS

| 5,079,656 | 1/1992 | Hoshi .................................... 360/99.04 |
| 5,150,512 | 9/1992 | Hatchett et al. ...................... 29/603.03 |
| 5,366,200 | 11/1994 | Scura .................................... 360/97.02 |
| 5,414,574 | 5/1995 | Boutaghou et al. ................. 360/97.02 |
| 5,483,398 | 1/1996 | Boutaghou ........................... 360/97.02 |
| 5,537,270 | 7/1996 | Morehouse et al. ................. 360/97.02 |

FOREIGN PATENT DOCUMENTS

| 4-259979 | 9/1992 | Japan . |
| 5-41028 | 2/1993 | Japan . |

Primary Examiner—Brian E. Miller
Attorney, Agent, or Firm—Wolf, Greenfield & Sacks, P.C.

[57] ABSTRACT

A flexible disk drive unit including a spindle motor for driving to rotate a magnetic disk; magnetic heads opposing the magnetic disk; a carriage attached to a frame and movable in a radius direction of the magnetic disk; wherein the frame and a motor base constitute a common member and the spindle motor is of a sensorless drive system and is directly attached to the frame; and wherein the frame is provided with an attaching hole for erecting a bearing of the spindle motor of the sensorless drive system on the frame.

7 Claims, 21 Drawing Sheets

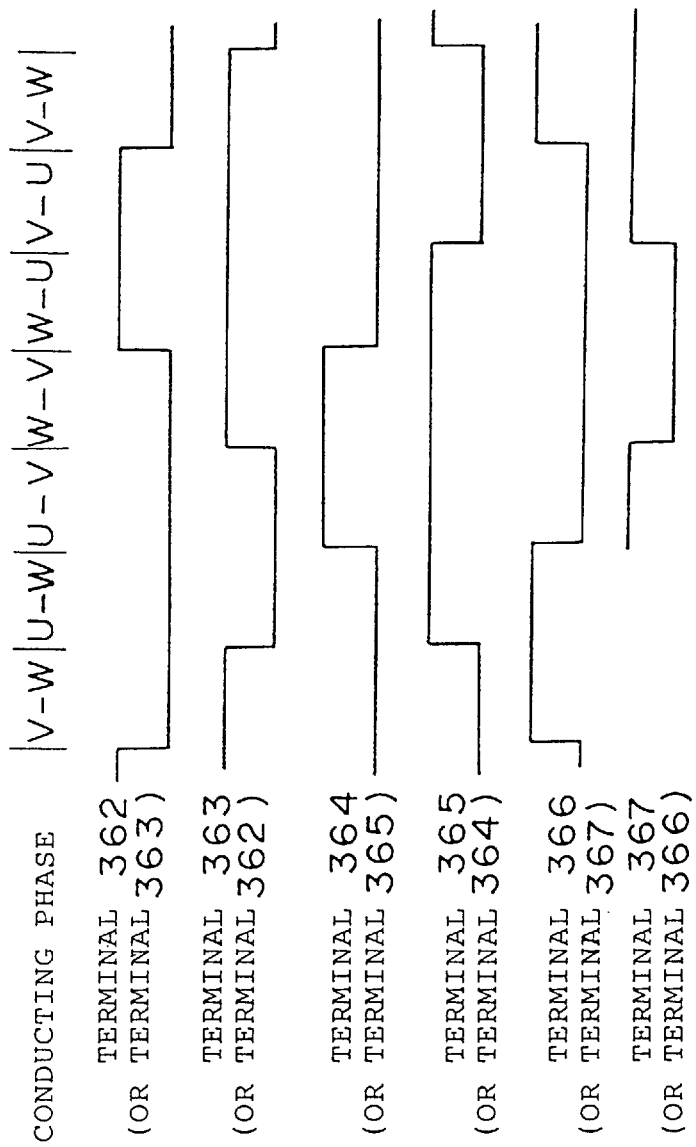

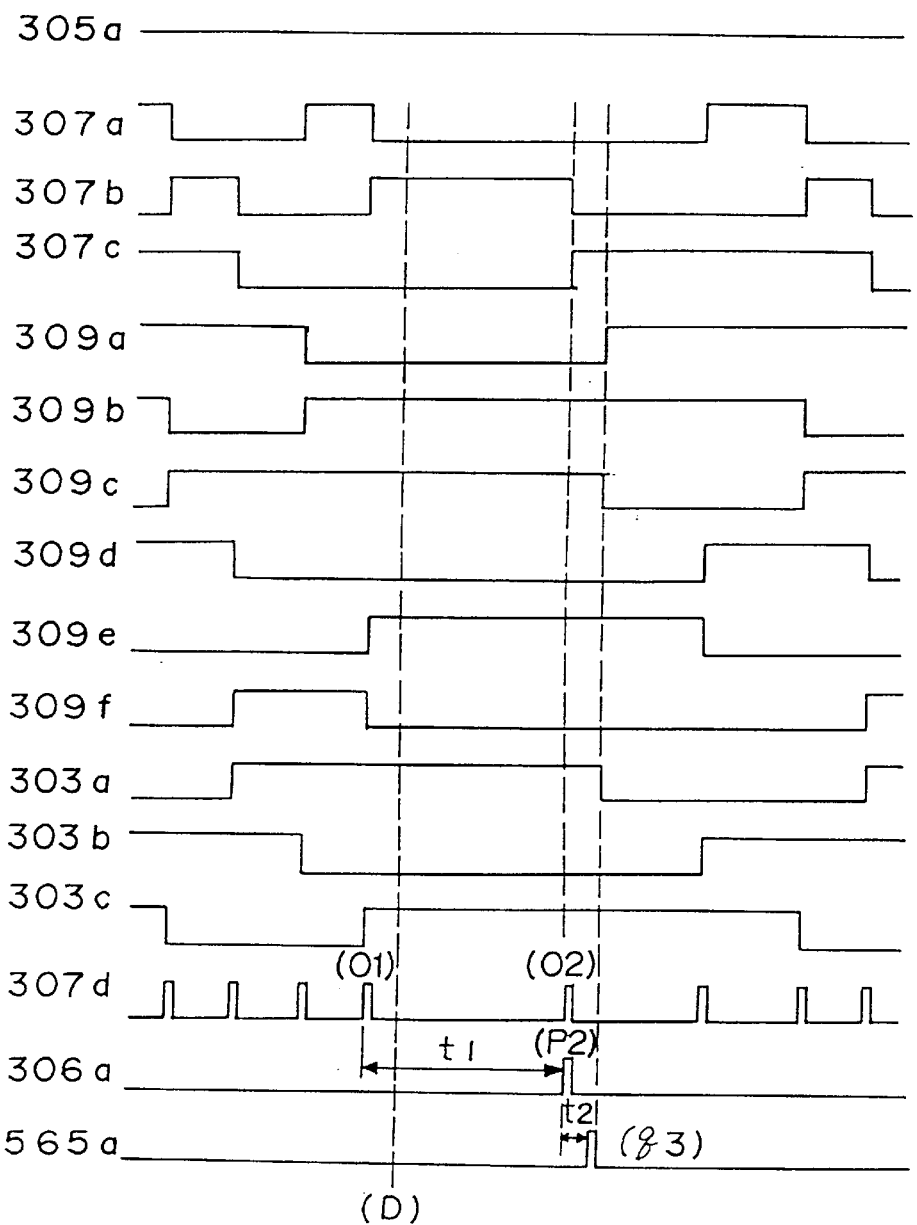

FIGURE 16

| INPUT PULSE NO. | 307a | 307b | 307c |
|---|---|---|---|
| 0 | L | L | L |
| 1 | H | L | L |
| 2 | L | H | L |
| 3 | L | L | H |
| 4 | H | L | H |
| 5 | L | H | H |
| 6 | L | L | L |
| 7 | H | L | L |
| ... | ... | ... | ... |

FIGURE 17

| 309a | 309b | 309c | 309d | 309e | 309f | 307a | 307b | 307c |
|---|---|---|---|---|---|---|---|---|
| H | L | H | L | L | H | L | L | L |
| L | H | H | L | L | H | H | L | L |
| L | H | H | L | H | L | L | H | L |
| H | H | L | L | H | L | L | L | H |
| H | H | L | H | L | L | H | L | H |
| H | L | H | H | L | L | L | H | H |

A : B = 1 : 2

FRAME FOR FLEXIBLE DISK DRIVE UNIT HAVING DISTORTION PREVENTION HOLE AND 2 RIBS FORMED AROUND MOTOR ATTACHING HOLE

This application is a continuation, of application Ser. No. 08/525,334, filed Sep. 7, 1995 now abandoned.

The present invention relates to a flexible disk drive unit generally called as FDD and the structure of a frame of the unit which is a major part of the unit.

As shown in FIG. 21 that is an exploded perspective view of integrated bodies of respective mechanisms and component parts, a flexible disk drive unit of a first conventional example is formed by a frame structure in which a motor attaching hole 102 larger than the diameter of a rotor 34 of a spindle motor 3 for driving to rotate a magnetic disk (not shown) is opened in a frame 101 constituting a base of the unit and the spindle motor 3 is attached from the lower side of the frame 101. The spindle motor 3 is mounted on a motor base 111 constituted by an iron base printed winding board, a IC 112 for driving the spindle motor 3 and a Hall element for detecting magnetic poles (not shown) for detecting a rotational position of the rotor 34 as a sensor for detecting timings in driving the rotor 34 are mounted on the motor base 111 and a pattern for detecting the rotational speed (not shown) of the rotor 34 is formed thereon. Further, a so-called brushless motor is used for the spindle motor 3.

In this way the spindle motor 3 is previously integrated on the motor base 111 of the printed wiring board and the motor base 111 is attached to the lower face of the frame 101 (refer to FIG. 22) In FIG. 21, numeral 120 designates a carriage mechanism mainly constituted by a carriage 123 having magnetic heads 121 and 122 and a stepping motor 124 moving the carriage in a radius direction of the magnetic disk. Numeral 130 designates a cartridge holder mechanism mainly constituted by a cartridge holder 131 and a slide cam frame 132 for loading and unloading a disk cartridge (not shown) for inserting into the cartridge holder 131. Numeral 133 designates a shutter opener. Numeral 140 designates a frame cover and numeral 150 designates a door mechanism constituted by a door 151, a panel 152 having an inserting and drawing port for a disk cartridge and a knob 153 for taking out the disk cartridge.

Next, a simplified explanation will be given of the operation of this conventional device. An inserted disk cartridge is held by the cartridge holder 131 and is loaded at a predetermined position by a cam mechanism of the slide cam frame 132. A magnetic disk that is a record medium accommodated in the disk cartridge is rotated by the spindle motor 3 and recording or reproducing of signals is performed by the magnetic heads 121 and 122 attached to the carriage 123 such that they pinch the magnetic disk from both sides thereof. The carriage 123 is movable in the radius direction of the magnetic disk and can record or reproduce signals to or from an arbitrary track. When accuracy of the frame 101 is not ensured at this occasion, positional relationship among the magnetic disk and the magnetic heads 121 and 122 is not confined in a predetermined range and therefore, normal recording or reproducing cannot be performed.

Meanwhile, strength, rigidity and flatness of a frame in a flexible disk drive unit are extremely important factors in ensuring the accuracy of the frame. That is, the ensuring of the strength and the rigidity of the frame is important in restraining a distortion caused by attaching in system loading of the device. When the distortion by attaching is caused, a relationship between a height of the magnetic head on the carriage and a height of a medium hub face of the spindle motor is deteriorated and an error in writing/reading is caused when it exceeds an allowable value.

The above-mentioned drawback is applicable to the flatness of the frame. Further, the deterioration in the flatness of the frame deteriorates the perpendicularity of a shaft of the spindle motor and causes deterioration in eccentricity or wow and flutter. The deterioration in the flatness must be restrained as less as possible since there are portions in which sufficient clearances can not be provided in view of design in downsizing or thinning the device.

However, the large motor attaching hole 102 is opened in the frame of the first conventional device as mentioned above and therefore, the strength and the rigidity of the frame are lowered and considerable difficulty is accompanied in producing the flatness of the frame which is problematic in ensuring the accuracy. Furthermore, the frame 101 is laminated on the motor base 111 of the spindle motor 3 as shown in FIG. 22 which is problematic in thinning the device.

To enhance the strength and the rigidity of the frame a construction is proposed in, for example, Japanese Unexamined Utility Model Publication No. 193566/1986 wherein a spindle motor is directly attached to a frame in which a hole provided on the frame is made as small as possible. However, in the construction of this device, a small cylinder portion for constituting a bearing of a shaft of the spindle motor is integrally formed with the frame made by aluminum die casting and the spindle motor is attached to a lower face of the frame via a motor base. Therefore, the frame is interposed between a hub and the rotor of the spindle motor whereby integration of the spindle motor is not so much facilitated. Further, no effect is provided in thinning the device.

There are Japanese Unexamined Patent Publication No. 290163/1989 and Japanese Unexamined Patent Publication No. 41028/1993 as examples of integrating a spindle motor from one side of a frame. Both of them are concerning a case of a hard disk drive unit (HDD) and the objects thereof are not concerning a flexible disk drive unit (FDD). It is easy in a HDD to accommodate a spindle motor in a case since disks are fixed whereas the accommodation is not simple in a FDD since a disk cartridge must be drawn therefrom or inserted thereinto, which is an essential difference therebetween.

As shown in FIG. 33 that is a broken perspective view of essential portions, a flexible disk drive unit of a second conventional example is provided with a frame structure wherein a motor attaching hole 702 larger than the diameter of a rotor 634 of a spindle motor 603 for driving to rotate a magnetic disk (not shown) is opened in a frame 701 constituting a base of the unit and the spindle motor 603 is attached from the lower side of the frame 701. The spindle motor 603 is mounted on a motor base 711 constituted by an iron base printed wiring board, a IC 712 for driving the spindle motor 603 and a Hall element (not shown) for detecting magnetic poles for detecting a rotational position of the rotor 634 are mounted on the motor base 711 and a pattern for detecting the rotational speed (not shown) of the rotor 634 is formed thereon. Further, a so-called brushless rotor is used for the spindle motor 603.

In this way, the spindle motor 603 is previously integrated on the motor base 711 of the printed wiring board and the motor base 711 is attached to the lower face of the frame 701. In FIG. 33, numeral 703 designates side wall plates attached to both sides of the frame 701 by screws 704 and numeral 604 designates a carriage mechanism mainly constituted by a carriage 643 having magnetic heads 641 and 642 and a stepping motor 644 for moving the carriage 643 in the radius direction of a magnetic disk. Numeral 605 designates a main body substrate provided for controlling the device.

This conventional example is provided with a drawback wherein the strength and the rigidity of the frame are deteriorated since the large motor attaching hole 702 is attached in the frame 701.

For example, Japanese Unexamined Patent Publication No. 259979/1992 discloses pressing of a sheet metal frame to achieve thinning of a device. In the device described in the publication, two top and bottom stages of drawing are performed on a bottom plate of a chassis, a motor base (printed wiring board) is attached on a drawn portion of the bottom stage from the lower side and a drawn portion of the top stage covers circuit parts on the board. However, even in this construction a large motor attaching hole similar to the above example is opened at the bottom plate portion of the chasis and therefore, the lowering of the strength and the rigidity of the chasis cannot be avoided. Although thinning of the frame may be considered in thinning of the device, such a frame is generally formed by die casting or by a method wherein a secondarily cutting is performed on the sheet metal frame. In case of the die casting there is a limit in thinning and a secondary cutting step is necessary to provide a desired wall thickness. There is a drawback of high cost in the frame accompanied by the secondary working.

The problem in the present invention is, firstly, in enhancing the strength and the rigidity of a frame in a flexible disk drive unit by making a hole opened in the frame as small as possible.

The second problem is in dispensing with a motor base of a spindle motor, enabling the spindle motor to be directly attached to the frame from one side thereof and enabling the device to be thinned.

The third problem is in enhancing accuracy in the perpendicularity of a motor shaft by thinning an attaching portion of the spindle motor while maintaining flatness of the frame.

The fourth problem is in providing an inexpensive frame omitting a secondary working such as cutting by partially thinning the frame in a pressing step and an inexpensive flexible disk drive unit.

According to a first aspect of the present invention, there is provided a flexible disk drive unit comprising:

a spindle motor for driving to rotate a magnetic disk;

magnetic heads opposing the magnetic disk;

a carriage attached to a frame and movable in a radius direction of the magnetic disk;

wherein the frame and a motor base constitute a common member and the spindle motor is of a sensorless drive system and is directly attached to the frame; and wherein the frame is provided with an attaching hole for erecting a bearing of the spindle motor of the sensorless drive system on the frame.

According to a second aspect of the present invention, there is provided the flexible disk drive unit according to the first aspect, wherein a rotor, a hub and a stator constituting the spindle motor of the sensorless drive system are arranged on either one of faces of the frame.

Here, a sensorless driving system in a spindle motor is a system in which a position of a rotor in a DC brushless motor is detected by inverse electromotive force signals induced in armature windings which is described in Japanese Examined Patent Publication No. 25038/1983 as a representative example. However, in the present invention, drive circuits constructed as below are utilized with objects of dispensing with a phase lag of position signals of a rotor, facilitating disposal of lead wires, stabilizing commutating operation etc.

According to a third aspect of the present invention, there is provided the flexible disk drive unit according to the first or second aspect, wherein the spindle motor of the sensorless drive system comprising:

means for detecting respective phase winding voltages of a brushless motor driving the rotor by armature windings of a plurality of phases;

means for correcting respective phase potentials and phases by adding or subtracting correction values each determined by a resistance and a winding current of each of the armature windings to and from each phase of detected winding terminal potentials during actual drive periods of time;

comparing means for comparing levels of the respective detected winding terminal potentials after the correction; and a drive circuit for driving the respective phases of the armature windings by applying position signals of the rotor detected by the comparing means thereto thereby driving the spindle motor.

According to a fourth aspect of the present invention, there is provided the flexible disk drive unit according to the first or second aspect, wherein the spindle motor of the sensorless drive system comprises:

rotor position signal forming means for detecting position signals of the rotor from respective phase winding potentials or inter-phase voltage differences of a brushless motor driving the rotor by armature windings of a plurality of phases;

a counter for detecting rising or falling edges of the position signals of the rotor outputted from the rotor position signal forming means, selecting necessary edge signals from the respective detected edge signals thereby forming one output and counting edge signals thereby forming drive signals applied on the respective phases of the armature windings in starting;

pulse generating means for rendering the one output from the counter to be an input and counting up the counter in case where the input has not been provided for a predetermined period of time; and a drive circuit for driving the armature windings by applying the output of the counter thereto in starting thereby driving the spindle motor.

According to a fifth aspect of the present invention, there is provided the flexible disk drive unit according to the first or second aspect, wherein the spindle motor of a sensorless drive system comprises:

rotor position signal forming means for detecting position signals of a rotor from respective phases of armature winding potentials or respective inter-phase voltage differences of a brushless motor driving the rotor by armature windings of a plurality of phases;

a counter for detecting rising or falling edges of the position signals of the rotor outputted from the rotor position signal forming means, selecting necessary edge signals from the respective detected edge signals thereby forming one output and counting edge signals thereby forming drive signals applied on the respective phases of the armature windings in starting;

pulse generating means for rendering the one output of the counter to be an input and counting up the counter in case where the input has not been provided for a predetermined period of time;

steady state rotation detecting means for monitoring a rotation of the motor by combinations of the position signals of the rotor and the output of the counter and outputting a restart pulse when the rotation is abnormal thereby forming a starting state; and a drive circuit for driving the armature windings by applying the output of the counter thereto when the rotation is abnormal thereby driving the spindle motor.

According to a sixth aspect of the present invention, there is provided the flexible disk drive unit according to the first or second aspect, wherein a first thickness of a portion of the frame for attaching the spindle motor is made thinner than a second thickness of other portion thereof.

According to a seventh aspect of the present invention, there is provided the flexible disk drive unit according to any one of the first aspect, the second aspect and the sixth aspect, further comprising a cylindrical member for mounting the bearing of the spindle motor and a stepped small radius portion fitted to the attaching hole of the frame and provided at an outer periphery of the cylindrical member in which the stepped small radius portion is erected by calking an end portion thereof.

According to an eighth aspect of the present invention, there is provided a flexible disk drive unit comprising:

a frame made by a sheet metal pressing;

a motor attaching portion formed thin at a bottom plate portion of the frame by crushing the portion by a press; and a spindle motor directly attached to the thin motor attaching portion for driving to rotate a magnetic disk.

According to a ninth aspect of the present invention, there is provided the flexible disk drive unit according to the eighth aspect, wherein the bottom plate portion of the frame is provided with a stepped portion and the motor attaching portion is provided at a lower portion thereof.

According to a tenth aspect of the present invention, there is provided the flexible disk drive unit according to the eighth or ninth aspect, wherein the thin motor attaching portion is a portion for attaching a stator of the spindle motor.

According to an eleventh aspect of the present invention, there is provided the flexible disk drive unit according to the eighth or ninth aspect wherein a plurality of distortion preventing holes are provided at the motor attaching portion for preventing a distortion in crushing the portion.

According to a twelfth aspect of the present invention, there is provided a frame for a flexible disk drive unit made by a sheet metal pressing and provided with side walls at both sides thereof comprising:

a thin wall portion formed at a bottom plate portion of the frame formed thin by crushing the bottom plate portion by a press for attaching a spindle motor;

a plurality of distortion preventing holes provided at the thin wall portion for escaping a distortion caused in the crushing; and a bearing attaching portion having a hole provided at a central portion of the thin wall portion for attaching a bearing of the spindle motor.

According to a thirteenth aspect of the present invention, there is provided the frame for a flexible disk drive unit according to the twelfth aspect, wherein the plurality of distortion preventing holes are arranged radially from the hole for attaching the bearing.

According to a fourteenth aspect of the present invention, there is provided the frame for a flexible disk drive unit according to the twelfth aspect, wherein the plurality of distortion preventing holes are arranged substantially symmetrically with respect to an axis in a seek direction.

According to a fifteenth aspect of the present invention, there is provided the frame for a flexible disk drive unit according to the twelfth aspect, further comprising twelve or more of beams supporting the bearing attaching portion.

According to a sixteenth aspect of the present invention, there is provided the frame for a flexible disk drive unit according to the twelfth aspect, wherein a ratio of an inner peripheral dimension to an outer peripheral dimension of each of beams supporting the bearing attaching portion is 1 to 2.

According to a seventeenth aspect of the present invention, there is provided the frame for a flexible disk drive unit according to the twelfth aspect, further comprising a plurality of second distortion preventing holes arranged outside of outer peripheries of beams supporting the bearing attaching portion.

According to an eighteenth aspect of the present invention, there is provided the frame for a flexible disk drive unit according to the seventeenth aspect, wherein the second distortion preventing holes extend at outer sides of the distortion preventing holes at both sides of the beams and an interval dimension between an inner periphery of each of the second distortion preventing holes and an outer periphery of each of the distortion preventing holes is determined to be t and an extension dimension between a circumferential end edge of each of the second distortion preventing holes and an end of an outer periphery of the beam at an extended portion of each of the second distortion preventing holes is determined to be 1.5 t where a plate thickness of the frame is t.

According to the first aspect of the present invention, it is not necessary to mount magnetic pole detecting elements such as a Hall element and to form a velocity detecting pattern on the motor base since the spindle motor of the sensorless drive system is used and therefore, it is not necessary that the motor base is constituted by a printing wiring board and the spindle motor can directly be attached on the frame made of aluminum or the like. Accordingly, the motor base and the frame constitute a common member, the attaching hole of the bearing for the motor can be made smaller and therefore, the strength and the rigidity of the frame can be enhanced. Further, the base for attaching the spindle motor is the same as the frame and therefore, the relationship between the height of the magnetic heads and the height of the medium hub face of the spindle motor is easily maintained in a predetermined range.

According to the second aspect of the present invention, the rotor, the hub and the stator constituting the spindle motor are arranged on either one of the faces of the frame and therefore, the spindle motor can be integrated from the one side of the frame and the opposite face of the frame becomes flat whereby the unit can be thinned.

According to the third aspect of the present invention, the drive circuit for the spindle motor corrects each phase of the detected wiring voltages by a voltage of the wiring current only during the actual drive periods of time and the armature is driven by combinations of signals derived by the comparison result of the wiring terminal voltages after the correction.

According to the fourth aspect of the present invention, the necessary signals among the rising or falling edges in the position signal of the rotor are selected and the armature windings are driven by the selected necessary signals in starting.

According to the fifth aspect of the present invention, the necessary signals among the rising or falling edges in the position signal of the rotor are selected, the rotation state of the motor is monitored and the armature windings are driven by the selected necessary signals when the rotation is abnormal.

According to the sixth aspect of the present invention, the flatness of the frame is provided by ensuring the strength and the rigidity thereof by making the thickness of the portion of the frame for attaching the spindle motor thin compared with that of the other portion. Thereby the perpendicularity of the motor shaft can be ensured.

According to the seventh aspect of the present invention, the perpendicularity of the motor shaft can be ensured by inserting the stepped small diameter portion of the cylindrical member into the attaching hole of the frame and calking the end portion thereof thereby fixing the bearing.

According to the eighth aspect of the present invention, the frame is made by the sheet metal pressing, the bottom plate portion of the frame is partially crushed thin and the spindle motor is directly attached to the thinned portion. Therefore, the strength, the rigidity and the flatness of the frame can be ensured since only the small attaching hole for the bearing of the spindle motor is opened in the thinned portion. Further, the unit can be thinned since the motor base as in the conventional example is dispensed with and the motor attaching portion is thinned. Further, the integration of the spindle motor is facilitated since the spindle motor is directly attached from one side of the frame.

According to the ninth aspect of the present invention, the stepped portion is provided in the bottom plate portion of the frame and the thin motor attaching portion is provided at the lower portion whereby the unit can be thinned.

According to the tenth aspect of the present invention, the thin wall portion is confined to only the portion for attaching the stator of the spindle motor by which the rigidity of the frame can be ensured.

According to the eleventh aspect of the present invention, the distortion caused by crushing can be escaped by the distortion preventing holes and therefore, the flatness and the dimensional accuracy of the thin wall portion (motor attaching portion) can easily be ensured.

According to the twelfth aspect of the present invention, the frame for the flexible disk drive unit can be made by the sheet metal pressing by which necessary accuracies (flatness, dimensional accuracy) necessary for the frame can be ensured and an inexpensive frame can be made.

According to the thirteenth aspect of the present invention, the distortion preventing holes are radially arranged in the radius direction by which the lowering of the rigidity due to the distortion preventing holes can be minimized and easy pressing can be realized while maintaining the flatness.

According to the fourteenth aspect of the present invention, the rigidity of the total of the frame can be stabilized by arranging the distortion preventing holes substantially symmetrically with respect to the axis in the seek direction.

According to the fifteenth aspect of the present invention, the rigidity is further easily ensured by rendering a number of the beams to twelve or more.

According to the sixteenth aspect of the present invention, an easy pressing can be performed while ensuring the accuracy and the rigidity of the frame by rendering the ratio of the inner peripheral dimension to the outer peripheral dimension of the beam to 1 to 2.

According to the seventeenth aspect of the present invention, the pressing can be performed easily while ensuring the accuracy and the rigidity of the frame by providing further the second distortion preventing holes outside of the outer periphery of the beams.

According to the eighteenth aspect of the present invention, the interval dimension between the inner periphery of the second distortion preventing hole and the outer periphery of the distortion preventing hole is determined to be "t" and the extension dimension between the circumferential end edge of the second distortion preventing hole and the end of the outer periphery of the beam at the extended portion of each of the second distortion preventing holes is rendered to be "1.5 t" (where t is a plate thickness of the frame) whereby the accuracy and the rigidity of the frame can further be ensured.

Figure 11A:
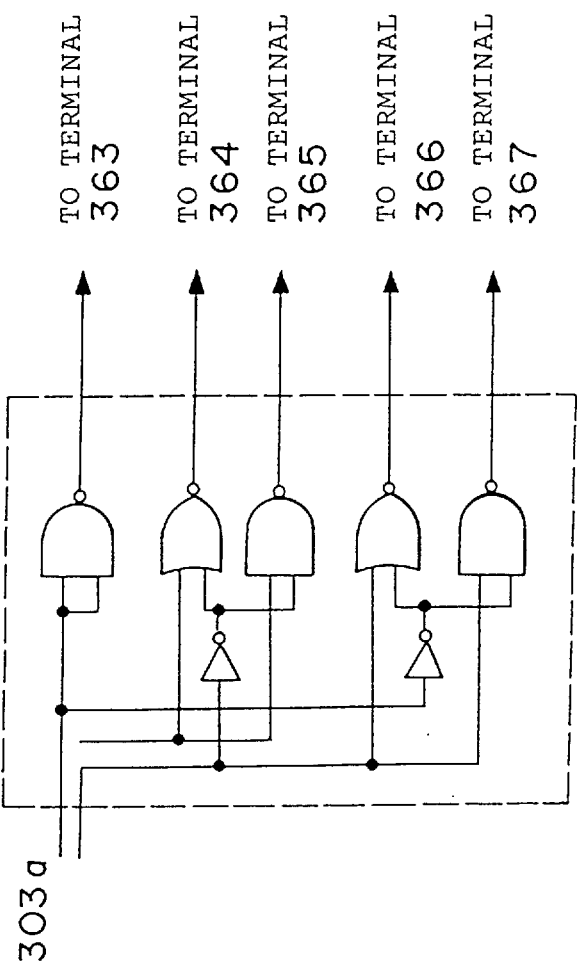
Figure 12:
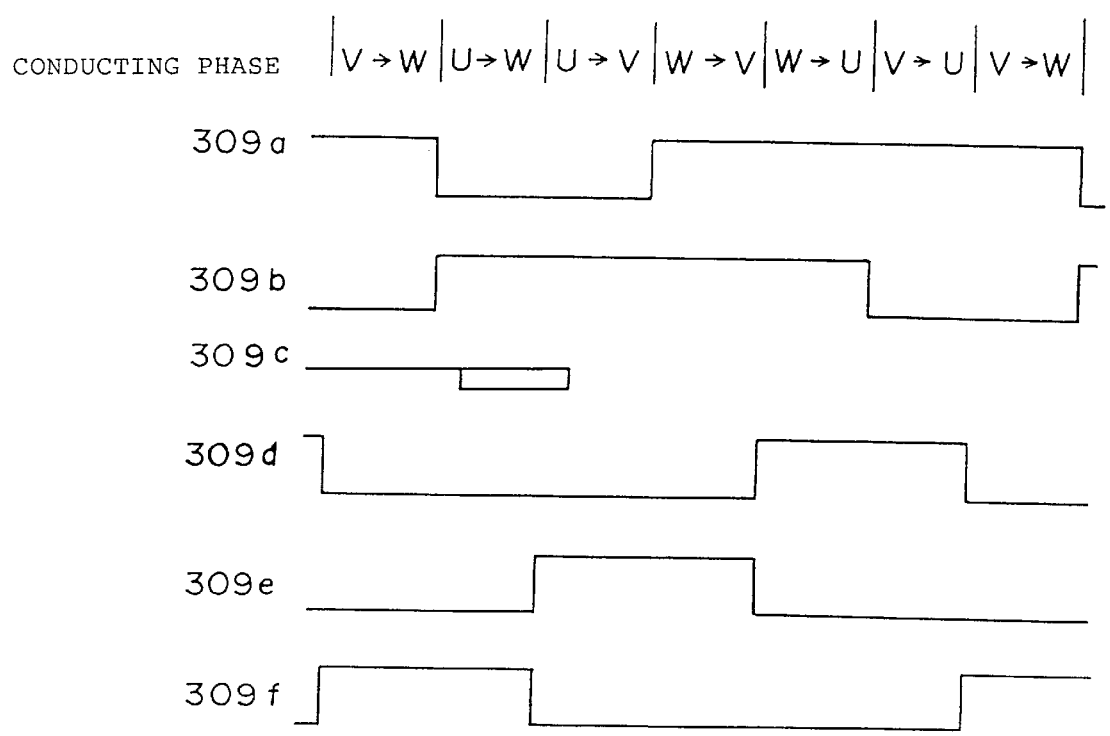
Figure 13:
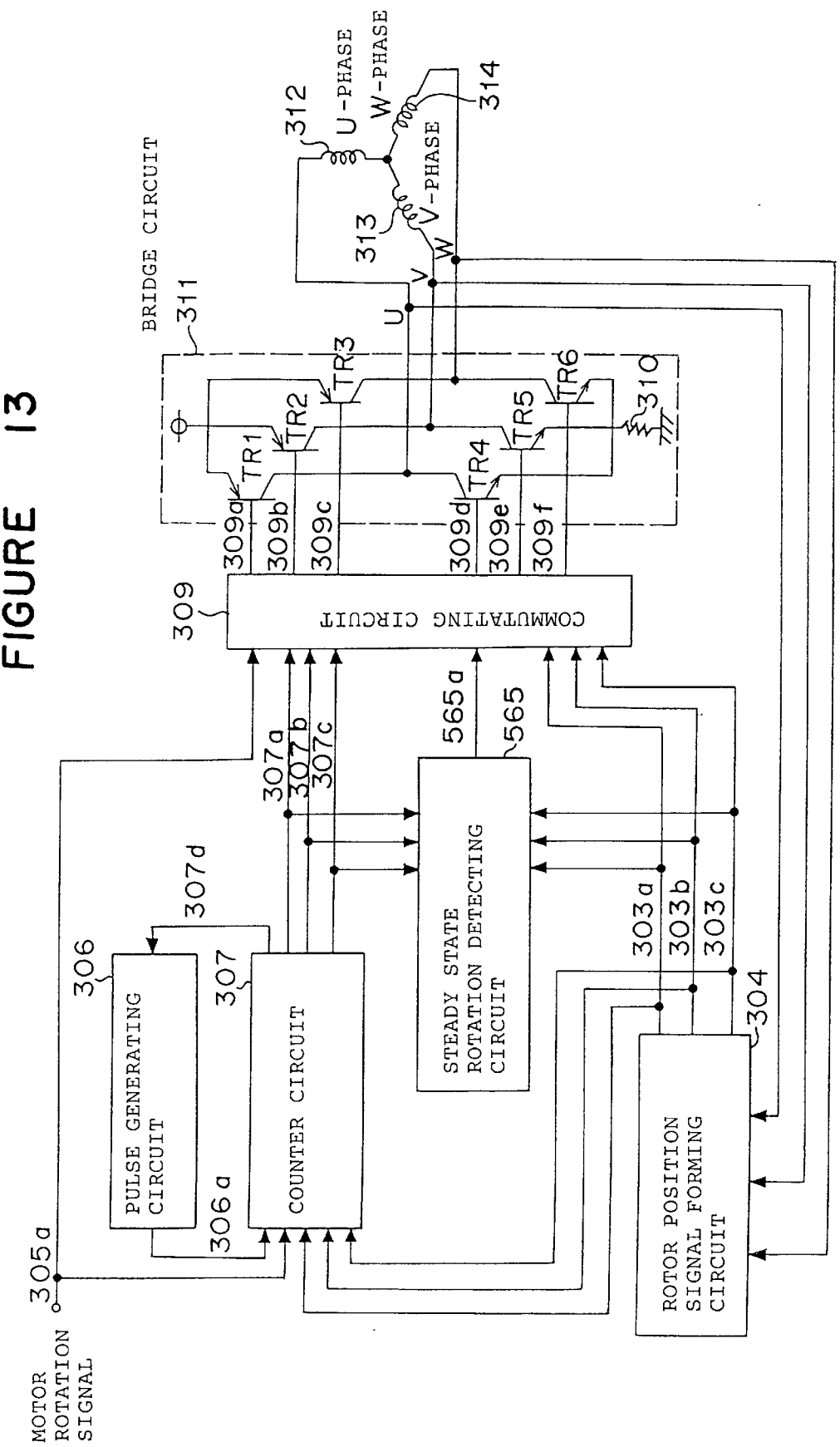
Figure 18:
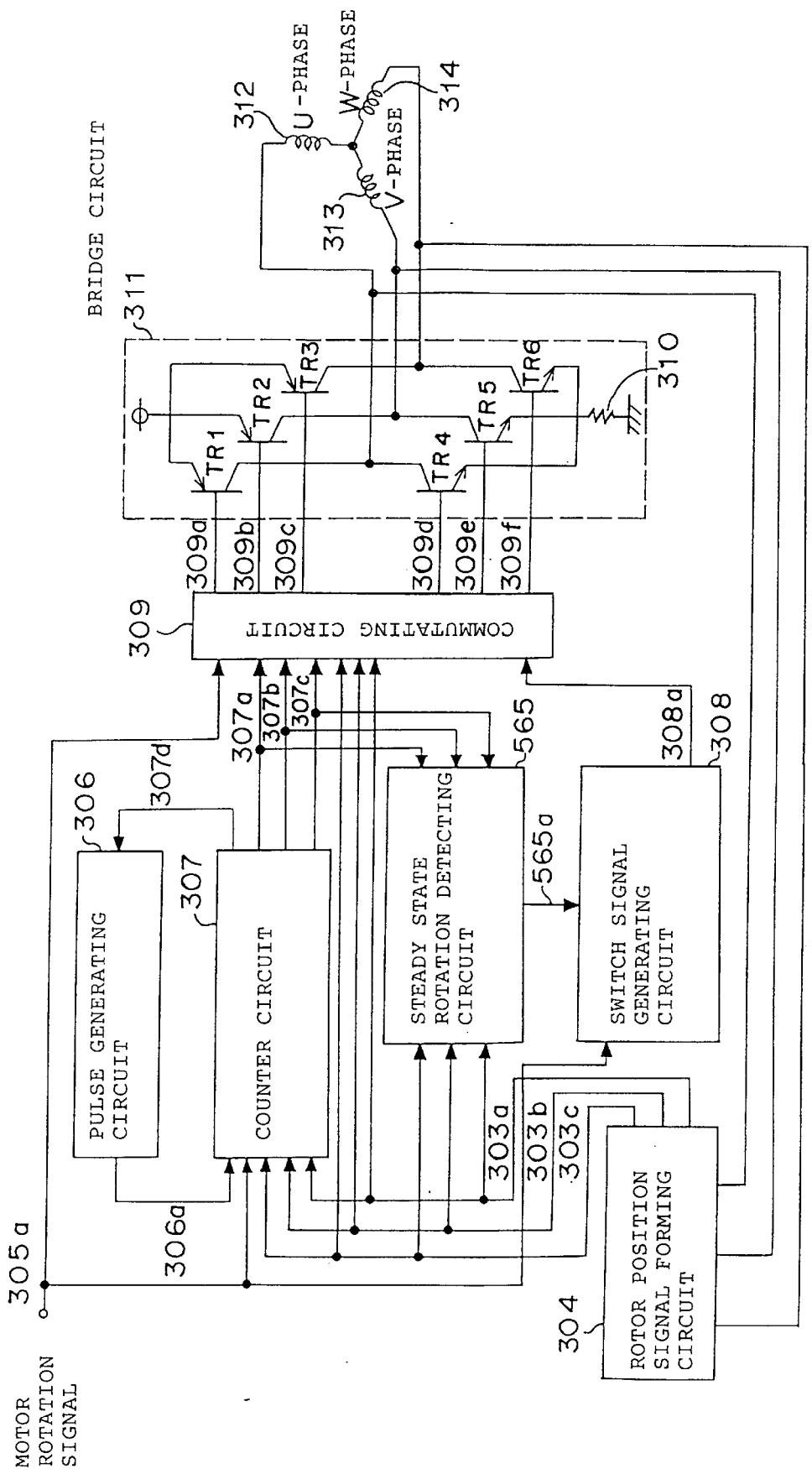
Figure 19:
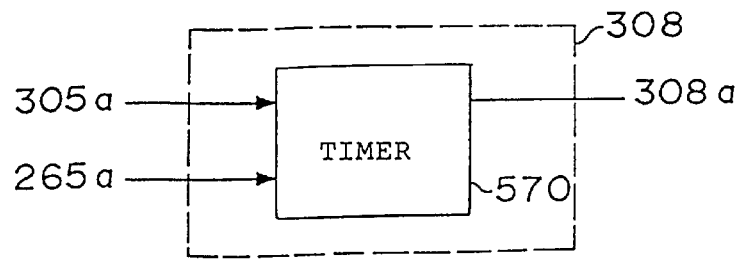
Figure 20:
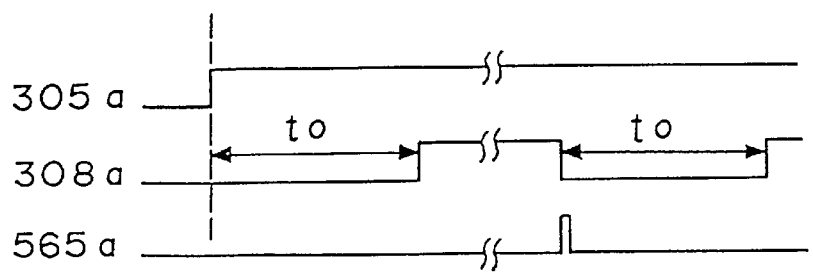
Figure 22:
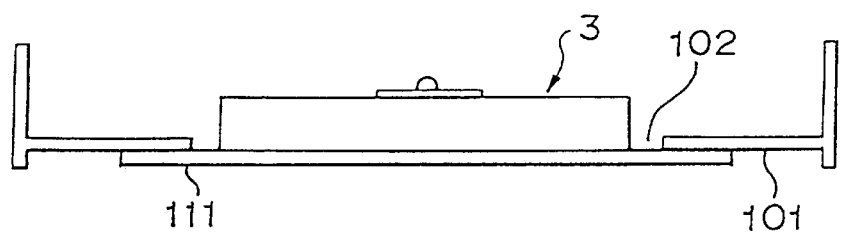
Figure 25:
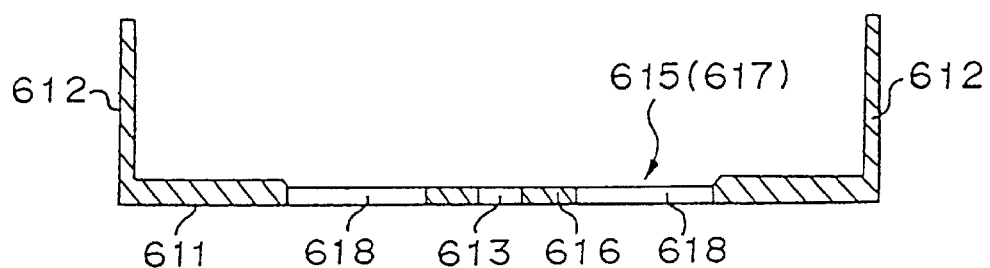
Figure 21:
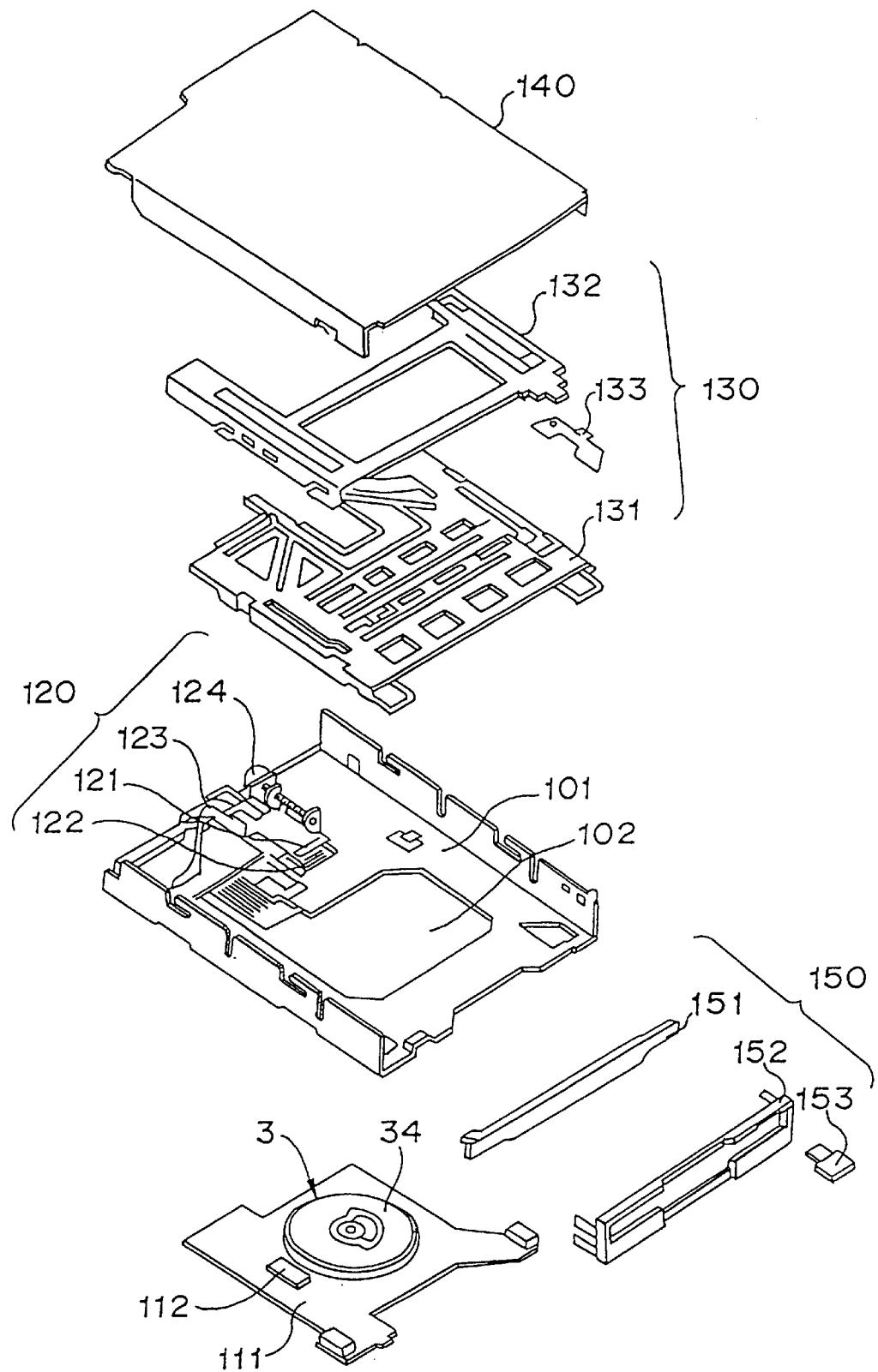
Figure 23:
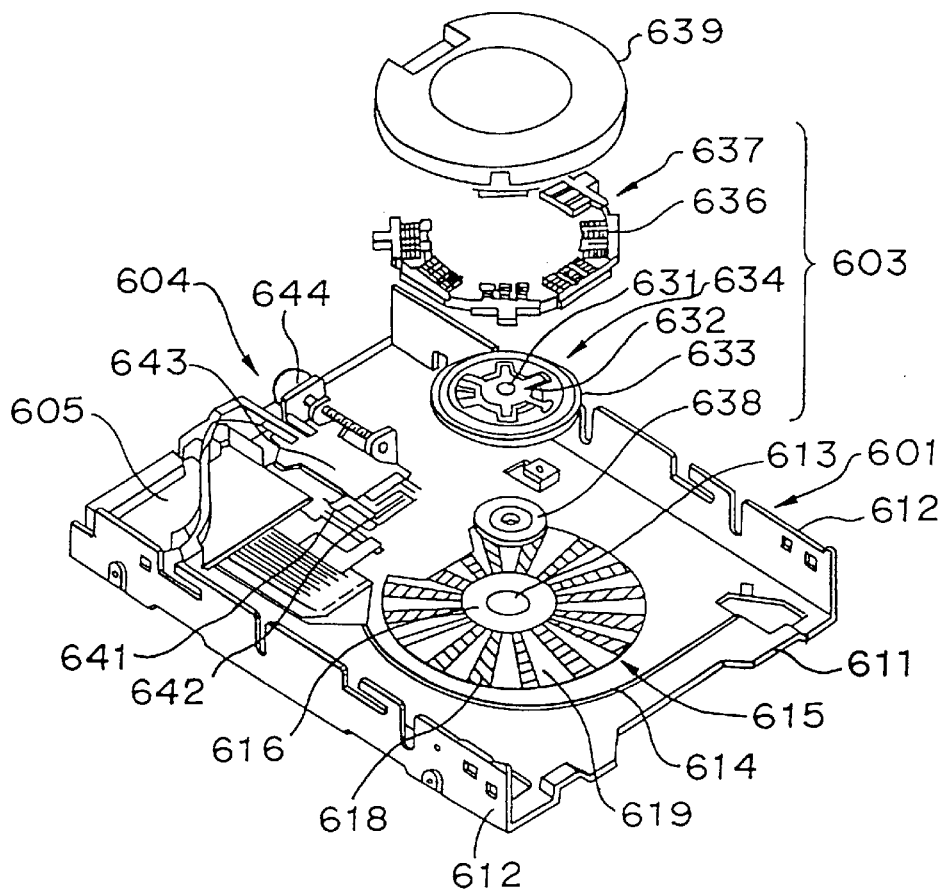
Figure 24:
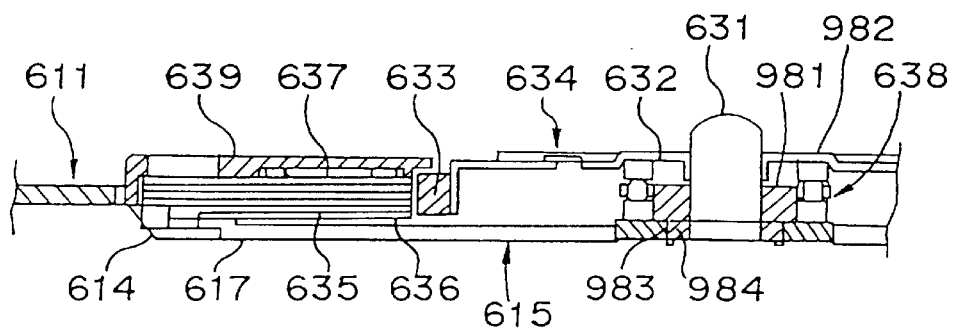
Figure 26:
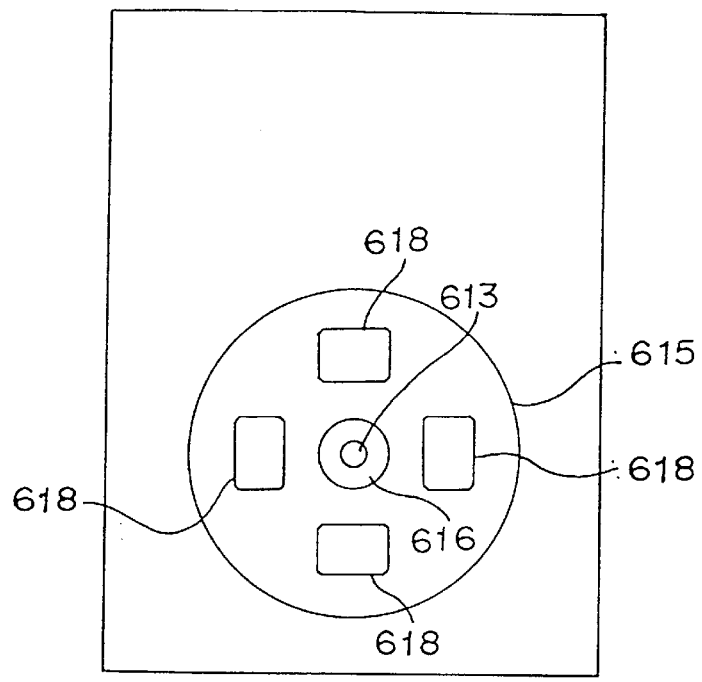
Figure 27:
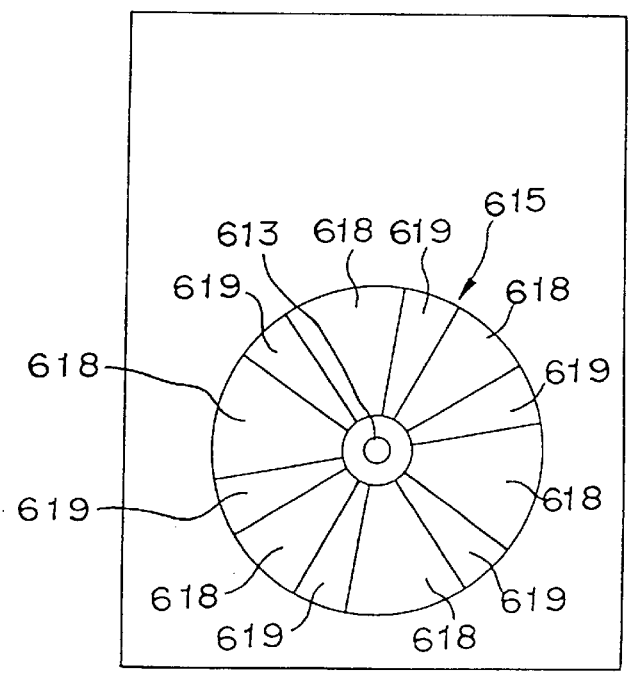
Figure 28:
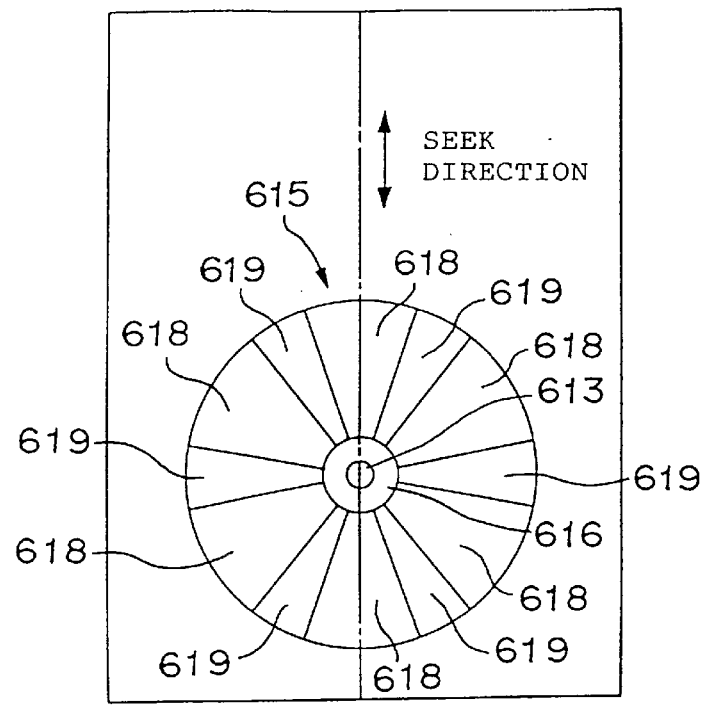
Figure 29:
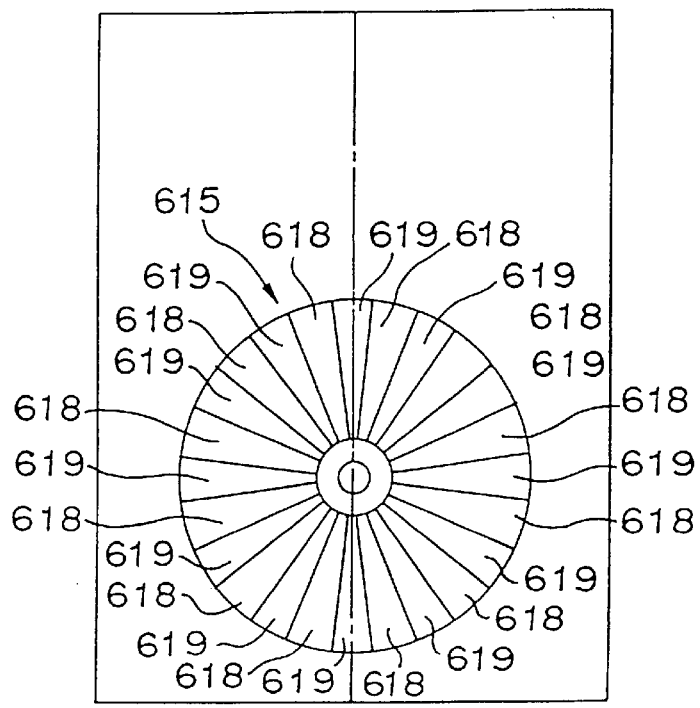
Figure 30:
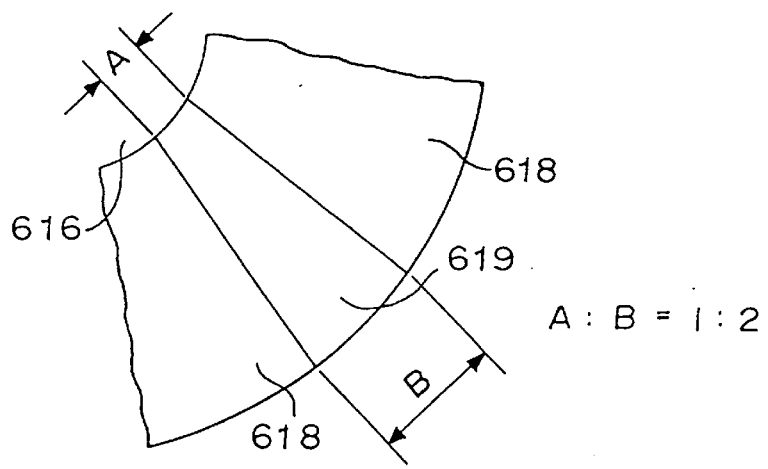
Figure 31:
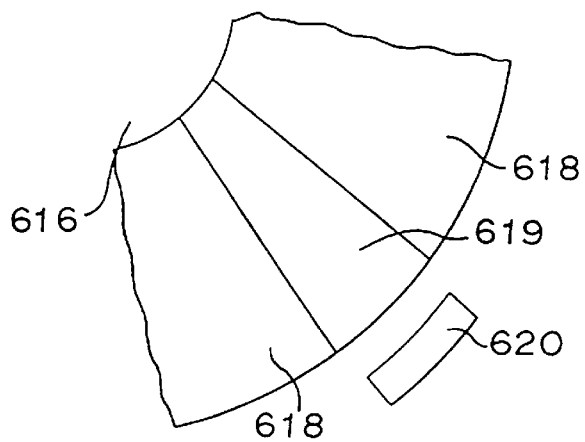
Figure 32:
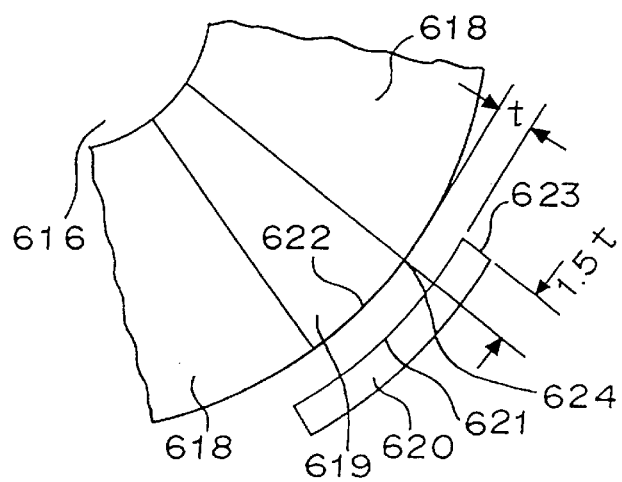
Figure 33:
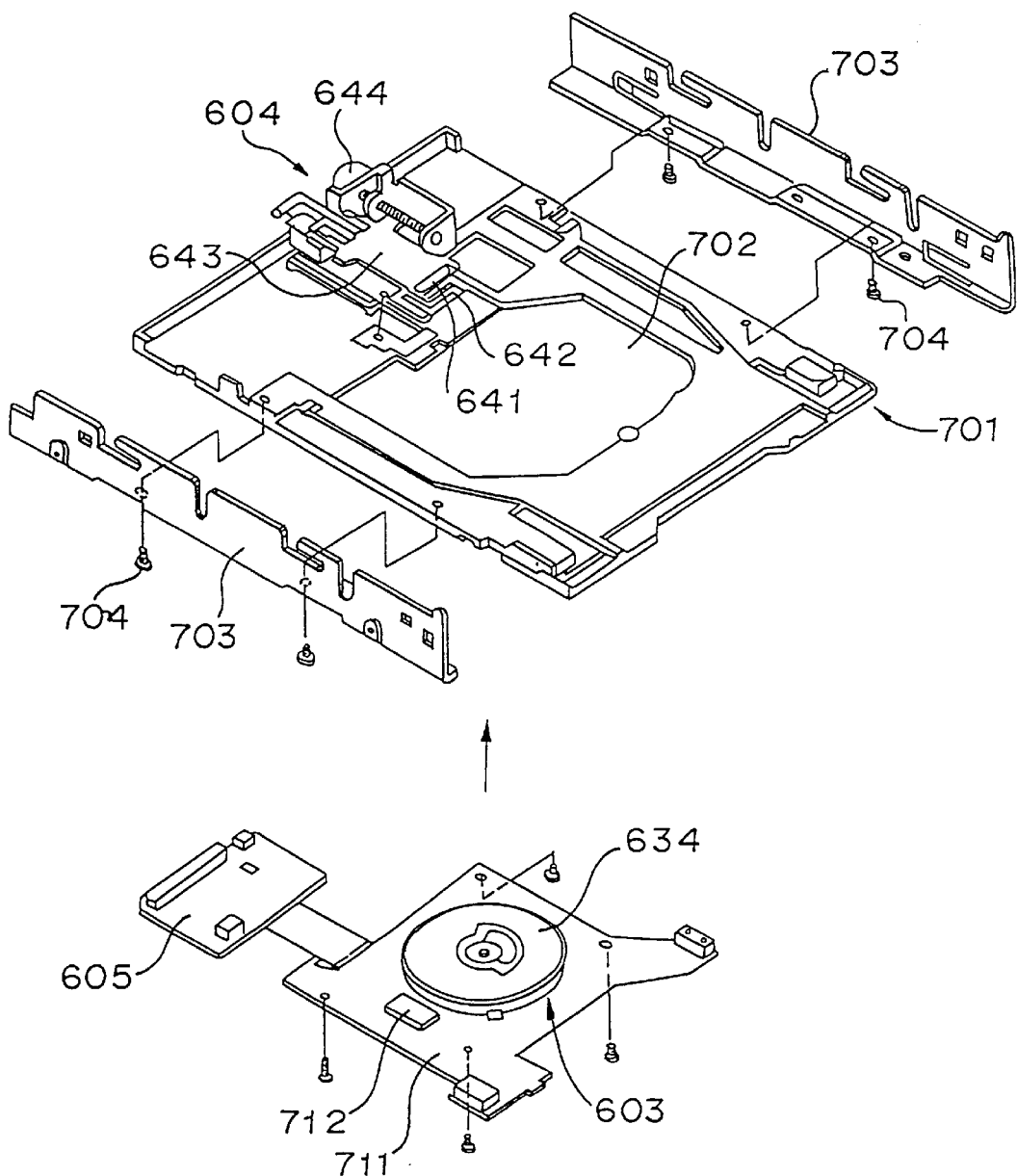

FIGS. 11(a) and 11(b) illustrate a structural diagram of correction switch signal forming circuit and signal waveform diagrams;

FIG. 12 illustrates diagrams showing a relationship among conductive phase and drive signals;

FIG. 13 is a block diagram showing a total structure of a fourth embodiment of the present invention;

FIG. 14 is a view illustrating a table showing a relationship among rotation position signals and counter values;

FIG. 15 illustrates timing charts for explaining the operation of the fourth embodiment;

FIG. 16 is a view illustrating a table for explaining the operation of a counter circuit in the fourth embodiment;

FIG. 17 is a view illustrating a table showing a relationship among drive signals and output values of the counter circuit;

FIG. 18 is a block diagram showing a total structure of a fifth embodiment of the present invention;

FIG. 19 is a diagram showing an example of a specific structure of a switch signal generating circuit in the fifth embodiment;

FIG. 20 illustrates timing charts for explaining the operation of the switch signal generating circuit in the fifth embodiment;

FIG. 21 is an outline broken perspective view showing a total structure of a first conventional flexible disk drive unit;

FIG. 22 is a front view of an attaching state of a conventional spindle motor;

FIG. 23 is a broken perspective view of essential portions of a flexible disk drive unit according to a sixth embodiment of the present invention;

FIG. 24 is a partial sectional view showing an attaching state of a spindle motor;

FIG. 25 is a sectional view of a frame according to a seventh embodiment of the present invention;

FIG. 26 is a plane view of a motor attaching portion according to an eighth embodiment of the present invention;

FIG. 27 is a plane view of a motor attaching portion according to a ninth embodiment of the present invention;

FIG. 28 is a plane view of a motor attaching portion according to a tenth embodiment of the present invention;

FIG. 29 is a plane view of a motor attaching portion according to an eleventh embodiment of the present invention;

FIG. 30 is an explanatory view showing a dimensional relationship of beams according to a twelfth embodiment of the present invention;

FIG. 31 is an explanatory view showing a second distortion preventing hole according to a thirteenth embodiment of the present invention;

FIG. 32 is an explanatory view showing a dimensional relationship of the second distortion preventing hole according to a fourteenth embodiment of the present invention; and FIG. 33 is a broken perspective view of essential portions of a second conventional flexible disk drive unit.

EXAMPLES

An explanation will be given of embodiments of the present invention in reference to the drawings. In the following drawings the same notations are used to portions the same with or corresponding to those in the conventional examples explained in FIG. 21 and FIG. 33.

EMBODIMENT 1

Figure 1:
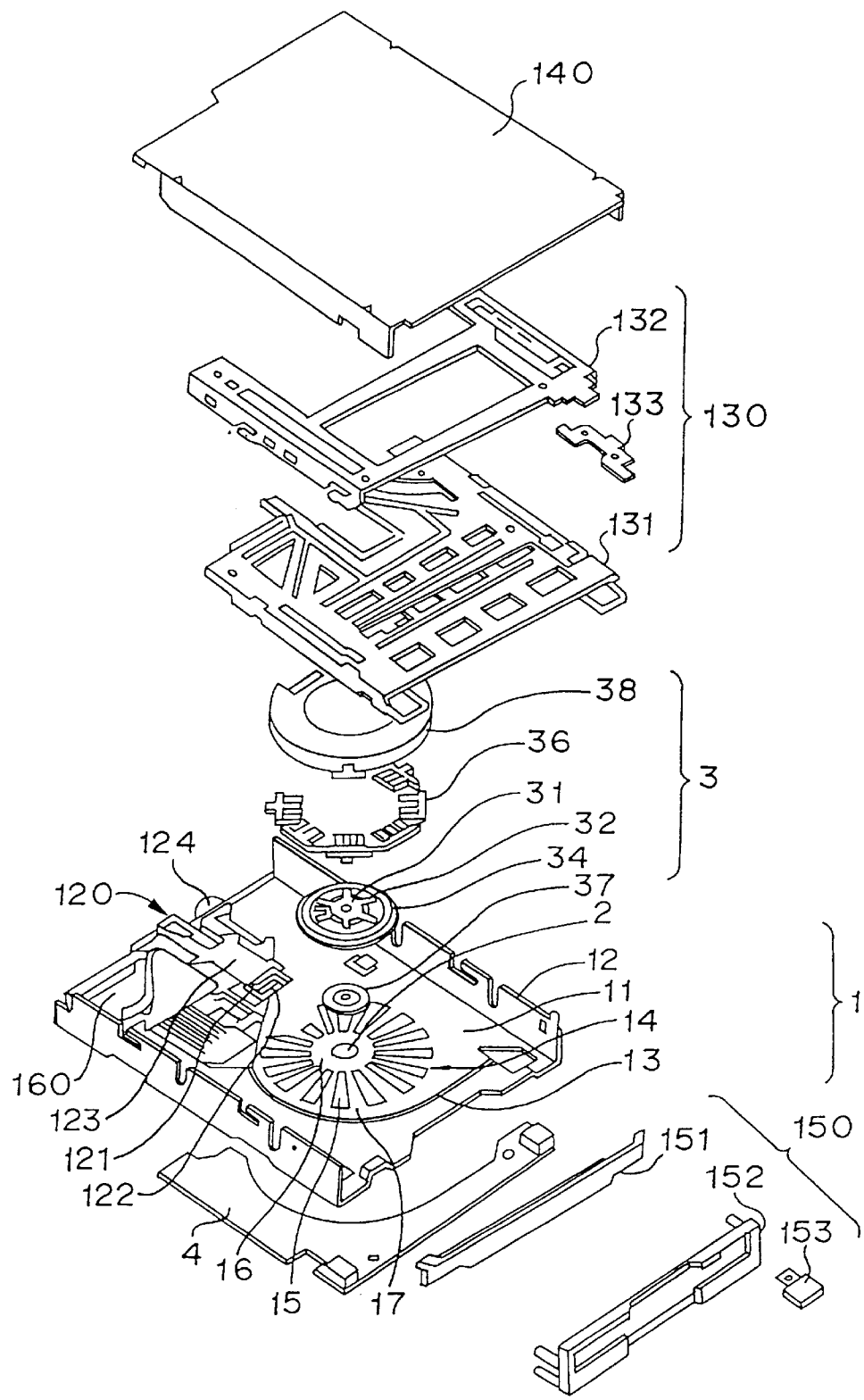
FIG. 1 is an outline broken perspective view showing a total structure of a flexible disk drive unit according to a first embodiment of the present invention.

FIG. 1 is a broken perspective view showing an outline of a total of a flexible disk drive unit according to a first embodiment of the present invention. In FIG. 1, numeral 1 designates a frame which is a member having a section constituted by a bottom plate portion 11 and side wall portions 12 on both sides thereof in a substantially channel-like shape. Numeral 2 designates an attaching hole for attaching a bearing of a spindle motor. The frame 1 is made by pressing an aluminum plate. Although not especially limited, the material and the manufacturing method of the frame are determined in consideration of the strength, the rigidity, the flatness of the frame, the manufacturing cost etc.

A spindle motor 3, a carriage mechanism 120, a cartridge holder mechanism 130 and a frame cover 140 are installed on the inner face side (upper side in FIG. 1) of the frame 1 and a door mechanism 150 is installed on the front side. A substrate 4 on which a driving IC (not shown) of the spindle motor 3 is installed on the outer face side (lower side in FIG. 1) of the frame 1. The bottom plate portion 11 of the frame 1 includes a stepped portion 13 for installing the substrate 4 formed in a special shape as illustrated in FIG. 1, the spindle motor 3 is attached on the lower portion and the substrate 4 is attached on the lower face of the higher portion. Further, numeral 160 designates a main body substrate provided for controlling the present unit which is installed on the inner face side of the frame 1.

Figure 2:
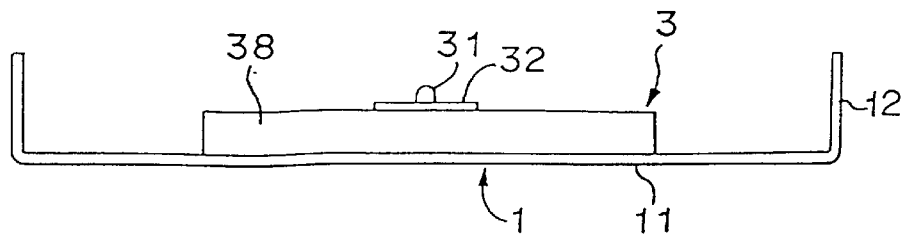
FIG. 2 is a front view showing an attaching state of a spindle motor of the first embodiment.
Figure 3:
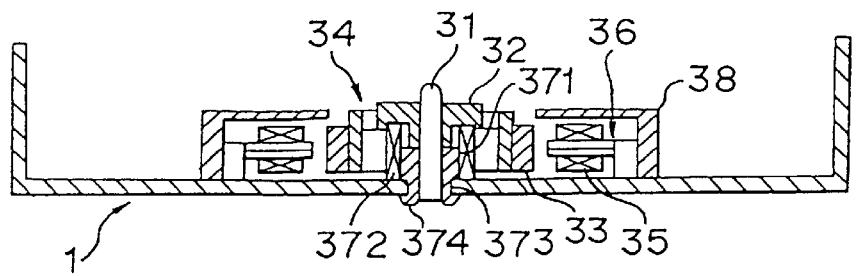
FIG. 3 is a sectional view of FIG. 2.
Figure 4:
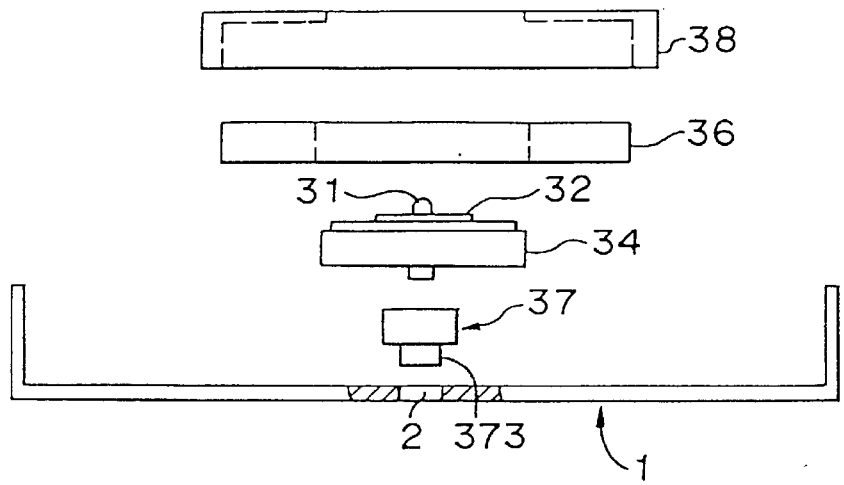
FIG. 4 is a broken view for explaining attaching of the spindle motor.

FIG. 2 is an outline front view showing a state of attaching the spindle motor on the frame, FIG. 3 is a sectional view of FIG. 2 and FIG. 4 is an explanatory broken view in integrating the spindle motor.

The spindle motor 3 is a DC brushless motor having a type in which a rotor is disposed at an inner peripheral portion and a stator is disposed at an outer peripheral portion as shown in FIG. 1 through FIG. 4 or a type generally called "outer rotor type" wherein the stator is disposed at the inner peripheral portion and the rotor is disposed at the outer peripheral portion as shown in FIG. 21 both of which are usable.

In explaining with respect to the former type, the spindle motor 3 is mainly constituted by a rotor 34 composed of a shaft 31, a hub 32 fitted to the shaft 31 and a magnet 33 fixed to an outer periphery of the hub 32 and consisted of a ring-like magnet 33 having multiple magnetized portions, a stator 36 arranged surrounding the rotor 34 and composed by winding drive coils 35 around a stator yoke in laminated layers made of a magnetic material, a bearing 37 supporting the shaft 31 and a cover 38 covering the stator 36. Further, the hub 32 and the rotor 34 are integrally formed.

The bearing 37 is composed by attaching a thrust bearing 372 on an outer periphery of a cylindrical member 371 and a stepped small diameter portion 373 is formed on an outer periphery of the cylindrical member 371. After inserting the stepped small diameter portion 373 into the attaching hole 2 of the frame 1, an end portion 374 thereof is calked. In this way the bearing 37 is fixed and vertically erected on the frame 1. Thereby the perpendicularity of the shaft 31 is maintained. Thereafter, as shown in FIG. 3 and FIG. 4, the shaft 31 is inserted into the cylindrical member 371, the rotor 34 is fitted to the shaft 31 around which a stator 36 is arranged and fixed and the cover 38 is put thereover by which the integration of the spindle motor 3 is finished.

Accordingly, the integration is extremely facilitated since the spindle motor 3 can directly be attached to the frame 1 from one side thereof. The strength and the rigidity of the frame 1 can be enhanced and therefore, the accuracy of the frame is easily ensured since only an extremely small hole just for inserting the stepped small diameter portion 373 of the bearing 37 is opened in the frame 1. Further, the motor base for a printed wiring board as in the conventional case is dispensed with and the spindle motor 3 can directly be attached to the frame 1 since the spindle motor 3 is of a sensorless drive system as mentioned later. The attaching base of the spindle motor 3 shares the same frame by attaching the spindle motor 3 directly on the frame 1 and therefore, it is easy to maintain the relationship among the heights of the magnetic heads 121 and 122 and the height of a face of the medium hub 32 of the spindle motor 3 in a predetermined range. Also the adjustment of the height relationship is facilitated. Further, the lower face of the frame 1 is substantially flat and therefore, the thinning of the present unit can be realized.

Further, the operation of the present unit is the same as that of the conventional example and the explanation will be omitted.

EMBODIMENT 2

Figure 5:
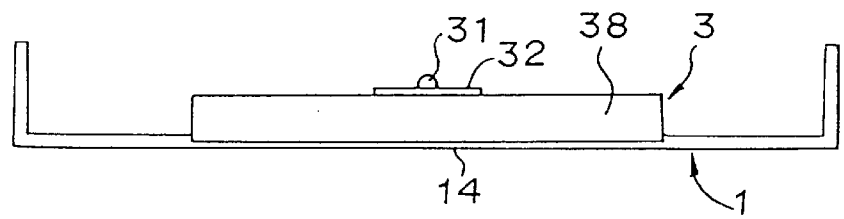
FIG. 5 is a front view showing an attaching state of a spindle motor according to a second embodiment of the present invention.

FIG. 5 is a sectional view of a portion of a frame for attaching a spindle motor showing a second embodiment of the present invention.

The thickness of a spindle motor attaching portion 14 is made thinner than that of other portion in this embodiment. Specifically, the thickness of the ring-like motor attaching portion 14 for installing the stator 36 is thinned as illustrated in FIG. 1. The frame 1 is made by pressing an aluminum plate wherein the ring-like portion 14 is crushed in the pressing. Further, a number of sector-like openings 15 are punched out by a press to escape distortion in crushing for ensuring the flatness of the frame 1. The attaching portion for the bearing 37 is supported by a number of radial ribs 17.

In this way the thickness of the motor attaching portion 14 is thinned and the flatness of the portion 14 is accurately maintained. Accordingly, it is easy to accurately maintain the perpendicularity of the shaft 31 of the spindle motor 3 attached thereon via the bearing 37.

The following examples are concerning drive circuits used as the sensorless drive system of the spindle motor (brushless motor) 3.

EMBODIMENT 3

In this embodiment respective phase armature winding voltages are detected and corrected by applying a correction voltage that is a product of a load resistance by a current only in an actual load state thereby providing terminal voltages at correct phases in the actual load state since a phase lag is caused if the correction is not performed. Drive voltages of the respective armature windings are formed by a commutating circuit based on the winding terminal voltages.

In this embodiment, an explanation will be given of the construction and the operation of a drive device of a brushless motor based on the above-mentioned way of thinking.

Figure 6:
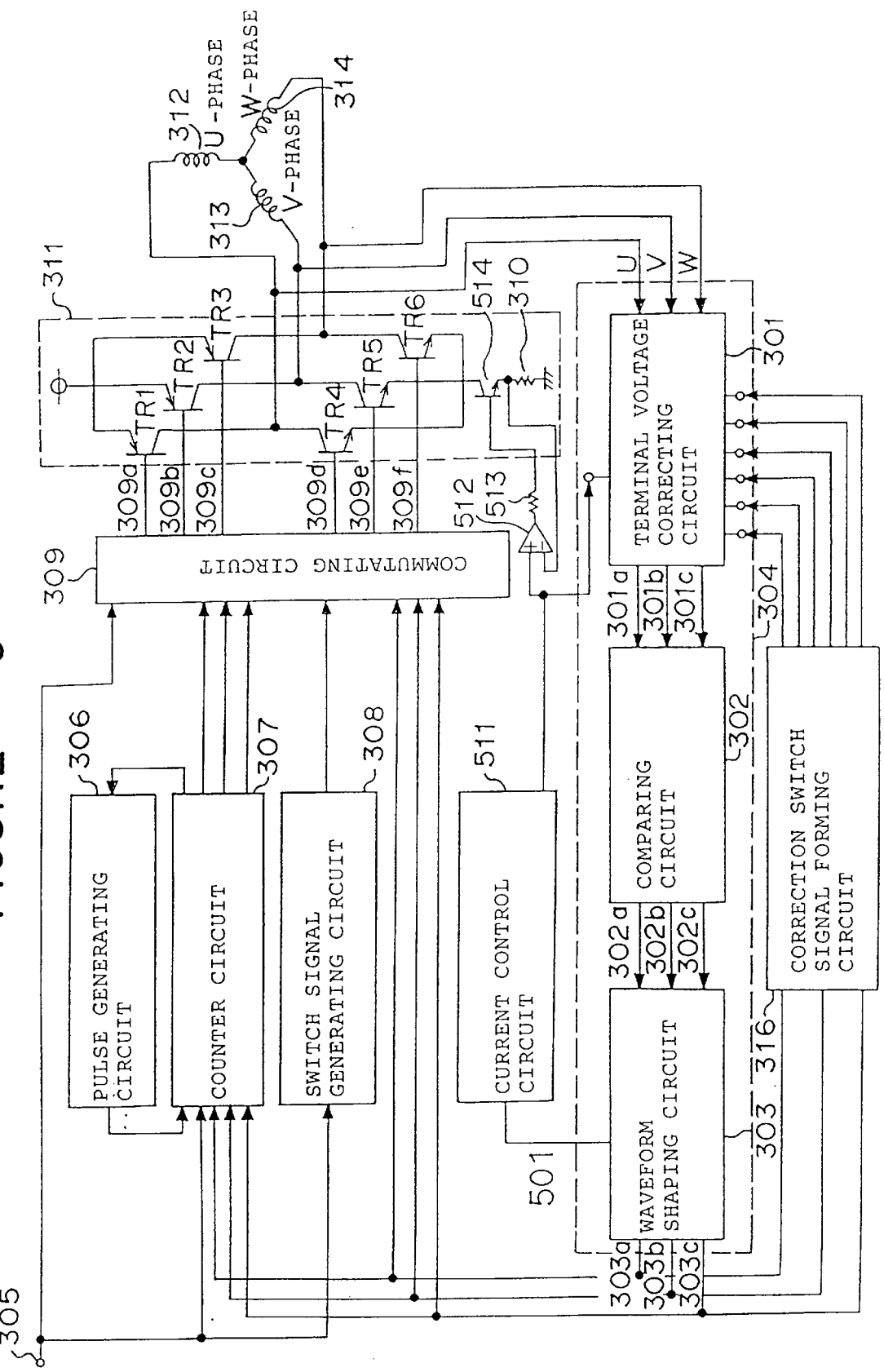
FIG. 6 is a block diagram showing a total structure of a third embodiment of the present invention.

FIG. 6 is a block diagram showing a drive circuit of the third embodiment. In FIG. 6, numerals 312, 313 and 314 designate armature windings (drive coils of the stator) of a brushless motor in three-phase star connection with ungrounded neutral point and numeral 311 designates a bridge circuit supplying predetermined drive currents to the armature windings 312, 313 and 314 by controlling to flow currents to a group of drive transistors TR1 through TR6. The armature windings 312, 313 and 314 are called U-phase, V-phase and W-phase for convenience' sake. Numeral 301 designates a terminal voltage correcting circuit for outputting corrected terminal voltage signals 301a, 301b and 301c by correcting the terminal voltages, numeral 302 designates a comparing circuit for providing logical signals 302a, 302b and 302c by comparing levels of the corrected terminal potentials of the respective phases, numeral 303 designates a waveform shaping circuit for providing rotor position signals 303a, 303b and 303c by shaping waveforms of the logical signals 302a, 302b and 302c and a rotor position signal forming circuit 304 is constituted by including the above-mentioned circuit means 301, 302 and 303. Numeral 305 designates a terminal to which a motor rotation signal enabling the motor to rotate is inputted, numeral 306 designates a pulse generating circuit, numeral 37 designates a counter circuit, numeral 308 designates a switch signal generating circuit and a commutating circuit 309 controls to switch the group of transistors TR1 through TR6 by outputting drive signals 309a through 309f in accordance with states of signals inputted from the rotor position signal forming circuit 304, the terminal 305, the counter circuit 307 and the switch signal generating circuit 308. Numeral 310 designates a resistor and numeral 311 designates a bridge circuit.

Figure 7:
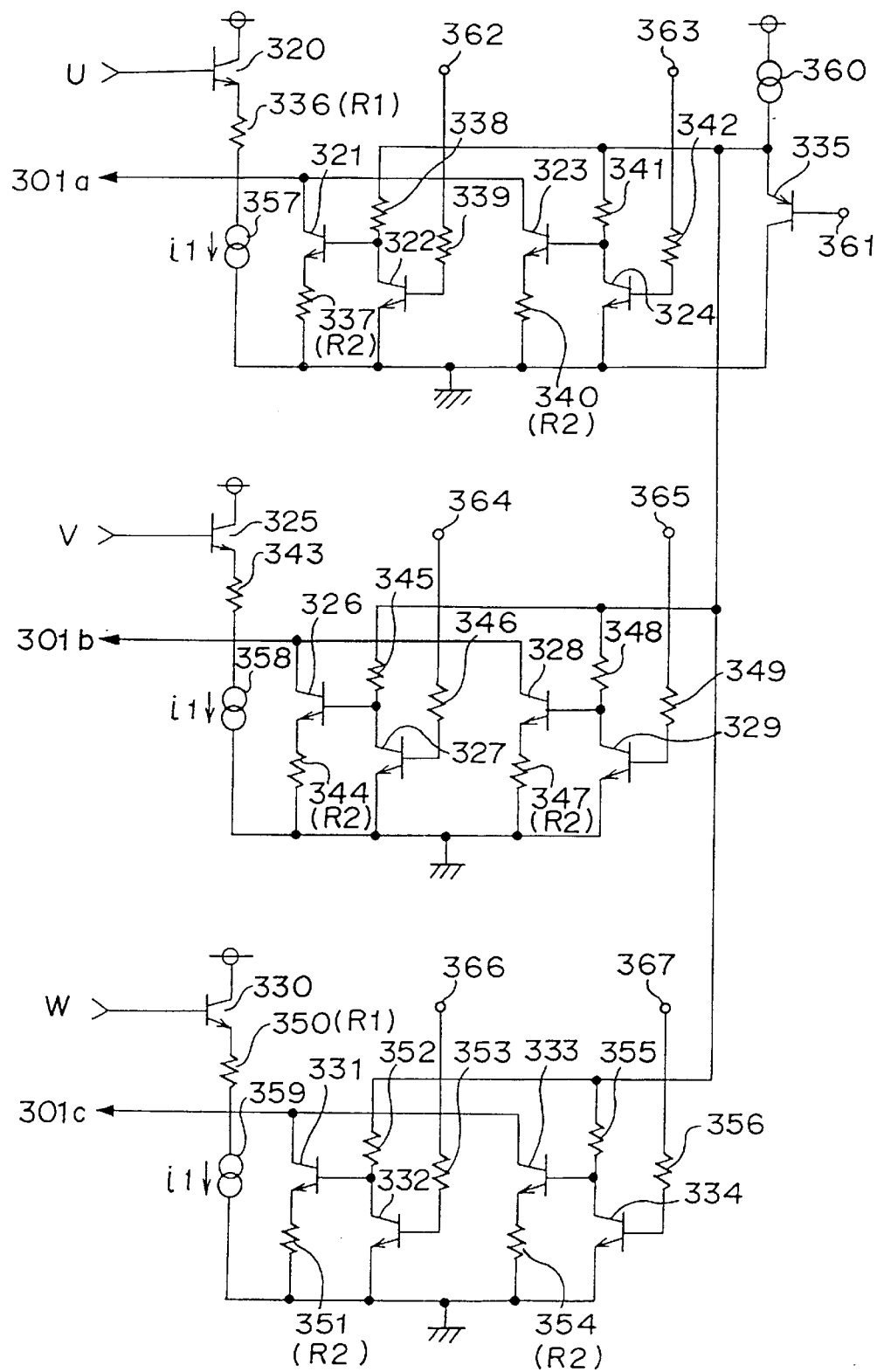
FIG. 7 is a diagram showing an example of a specific structure of a terminal potential correcting circuit.

FIG. 7 shows an example of a specific structure of the terminal potential correcting circuit 301. In FIG. 7, numerals 320 through 334 designate npn transistors, numeral 335 designates a pnp transistor, numerals 336 through 356 designate resistors, numerals 357 through 360 designate constant current sources. The U-phase terminal potential is inputted to the base of the npn transistor 320, the V-phase terminal potential is inputted to the base of the npn transistor 325, the W-phase terminal potential is inputted to the base of the npn transistor 330 and a terminal 361 to which a voltage with regard to a resistance drop of the armature winding is inputted, is connected to the base of the pnp transistor 335. Further, numerals 362 through 367 designate terminals to which correction switch signals for switching corrections of the terminal potentials are inputted. The corrected terminal potentials of the respective phases 301a, 301b and 301c are outputted from the circuit.

Figure 8:
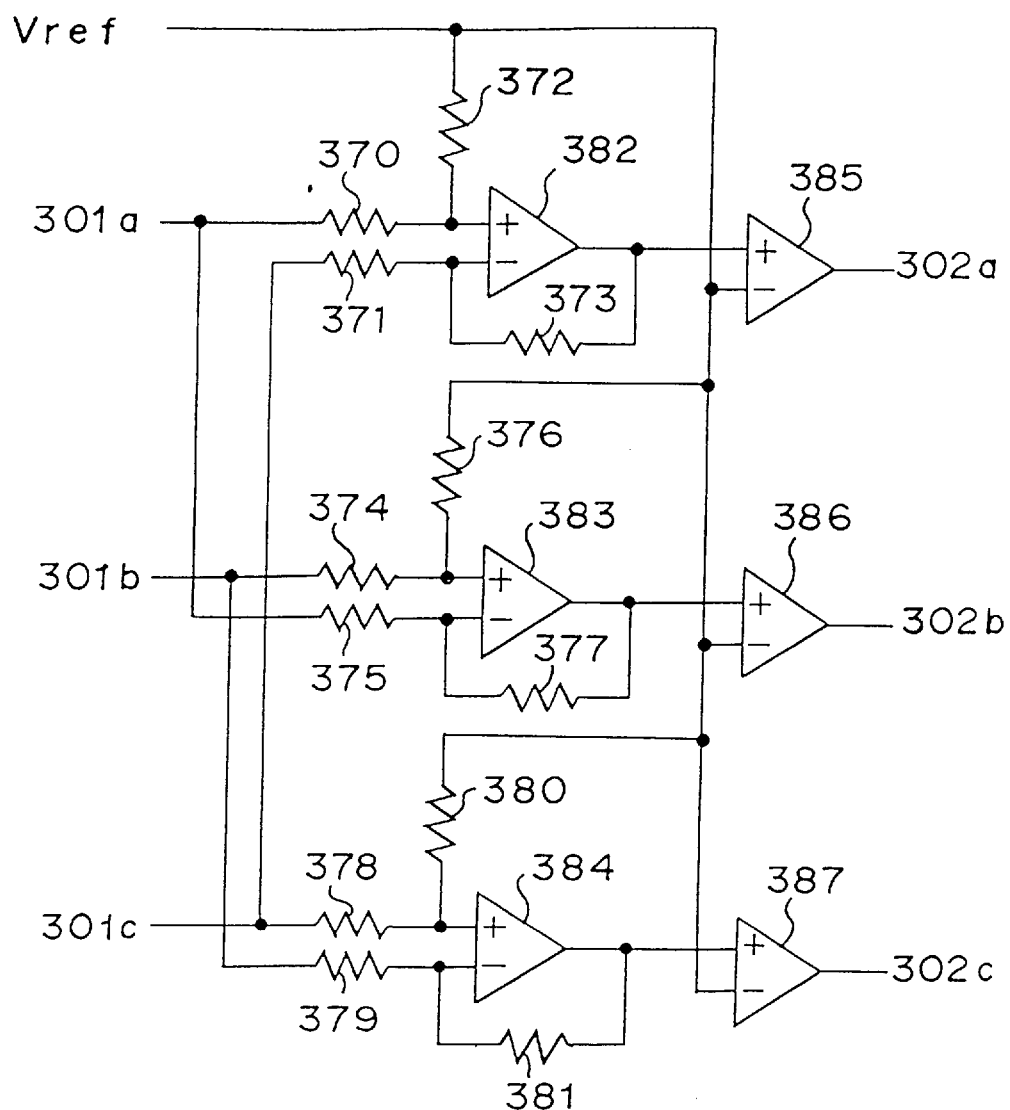
FIG. 8 is a diagram showing an example of a specific structure of a comparing circuit in the third embodiment.

FIG. 8 shows an example of a specific structure of the comparing circuit 302. In FIG. 8 numerals 370 through 381 designate resistors, numeral 382 through 384 designate differential amplifier circuits, numerals 385 through 387 designate comparators, the corrected U-phase terminal potential 301a is inputted to a noninverting input terminal of the differential amplifier circuit 382 and to an inverting input terminal of the differential amplifier circuit 383 respectively via the resistors 370 and 375, the corrected V-phase terminal potential 301b is inputted to a noninverting input terminal of the differential amplifier circuit 383 and to an inverting input terminal of the differential amplifier circuit 384 respectively via the resistors 374 and 379, and the corrected W-phase terminal potential 301c is inputted to a noninverting input terminal of the differential amplifier circuit 384 and to an inverting input terminal of the differential amplifier circuit 382 respectively via the resistors 378 and 371. The inverting input terminals of the differential amplifier circuits 382, 383 and 384 are connected to output terminals of the differential amplifier circuits 382, 383 and 384 via the resistors 373, 377 and 381 and respective output terminals thereof are connected to noninverting input terminals of the comparators 385, 386 and 387. Further, a reference voltage $V_{ref}$ is inputted to the noninverting input terminals of the differential amplifier circuits 383, 383 and 384 and inverting input terminals of the comparators 385, 386 and 387. The differential amplifier circuit 382 outputs a differential reference signal of the terminal voltages 301a and 301b with a central voltage of $V_{ref}$. A logical signal 302a is provided by comparing the differential amplifier signal with Vref by the comparator 385. Logical signals 302b and 302c are provided by the same procedure.

Figure 9:
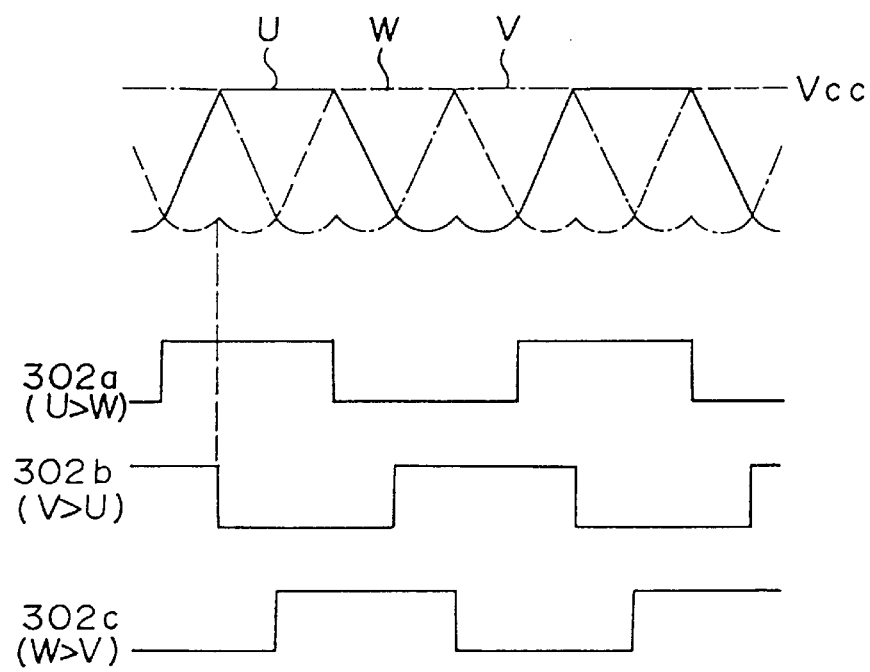
FIG. 9 illustrates signal waveform diagrams for explaining the operation of the third embodiment.

FIG. 9 shows a relationship among terminal voltage waveforms of respective phases in a nonloading time, the logical signals 302a, 302b and 302c outputted from the comparing circuit 302 and the conducting phase in case where the terminal potentials are not corrected. Although spike-like voltage variations are caused in the actual terminal potential waveforms in commutating them, the variations are omitted to simplify the explanation. In the nonloading time the resistance drop in the armature windings is almost negligible since the amount of current flow is small. The terminal potential waveforms are horizontally symmetrical as shown in FIG. 9 and the logical signals in a predetermined phase relationship with the rotor can be provided.

Figure 10:
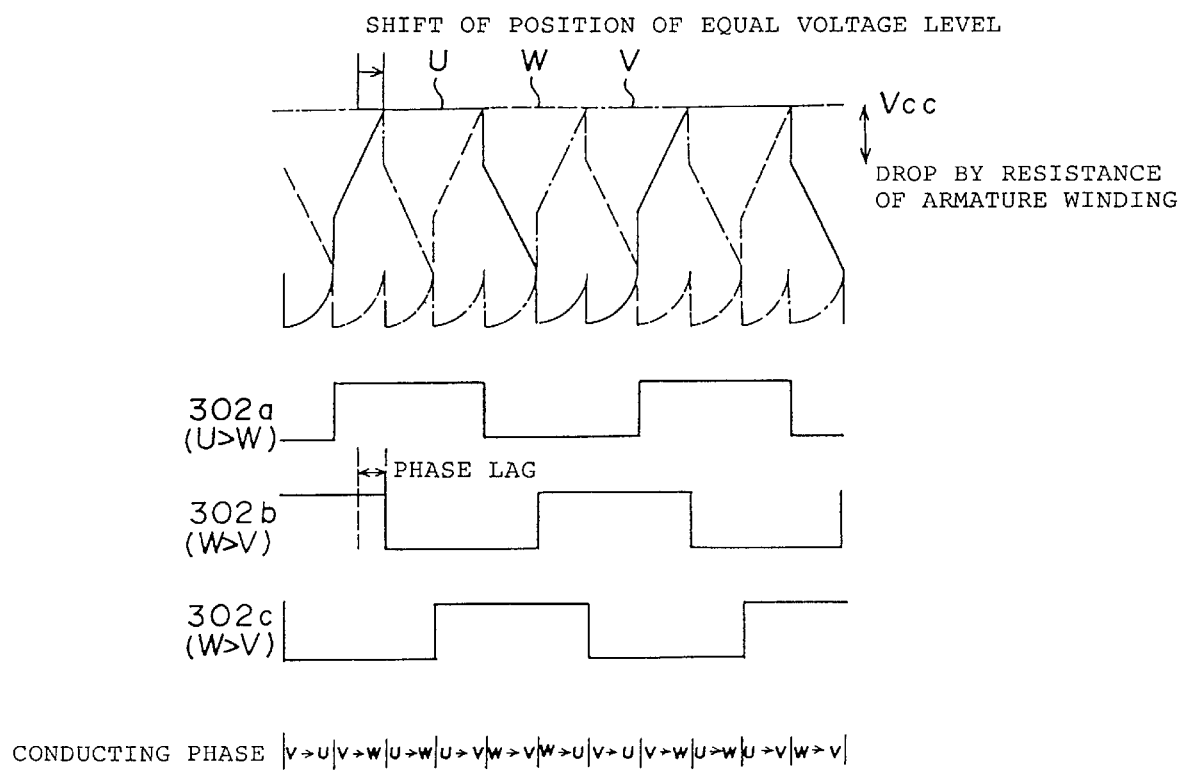
FIG. 10 illustrates signal waveform diagrams for explaining the operation of the third embodiment.

Meanwhile, FIG. 10 shows a relationship among the terminal potential waveforms of the respective phases, the logical signals 302a, 302b and 302c outputted from the comparing circuit 302 and the conducting phase in a loading time. In the loading time the influence of the resistance drop in the armature windings is not negligible due to the flowing currents. One of the compared two terminal voltages is in the conducting phase and the other is in the nonconducting phase. For example, when the current flowing is switched from V→W to U→W, the terminal potentials of the V-phase and the U-phase are compared with each other and the V-phase becomes the conducting phase and the U-phase becomes the nonconductive phase. A voltage of the resistance drop is superposed on the terminal potential waveform of the V-phase that is the conducting phase. Meanwhile, only the inverse electromotive voltage is generated since no current flows in the U-phase (the power source voltage of the bridge circuit is fixed to $V_{cc}$, the neutral point is ungrounded and therefore, the potential of the neutral point is dropped by the resistance drop and the actually observed terminal potential waveform is in a form in which the terminal potential of the U-phase that is the nonconductive phase is dropped). Accordingly, there causes a shift at a position where the potential levels of the V-phase terminal potential and the U-phase terminal potential are equal to each other and the phase of the provided logical signal lags behind in comparison with the case of the nonloading time as shown by the signal 302b in FIG. 10.

To solve the problem of causing the phase lag a voltage of the resistance drop is added to or subtracted from the terminal potential of the conducting phase, the levels of the terminal potentials are compared with each other and thereafter, the logical signals 302a, 302b and 302c are provided. For example, with regard to the U-phase the voltage of the resistance drop is subtracted therefrom when the current flows from the U-phase to the V-phase or the W-phase and the voltage of the resistance drop is added thereto when the current flows from the V-phase or the W-phase to the U-phase.

An explanation will be given concerning the specific operation of the terminal potential correcting circuit 301 in reference to the drawings as follows. Although the terminal potential correcting circuits of three phases of U, V and W are shown in FIG. 7, an explanation will be given here paying attention to the terminal potential correcting circuit of the U-phase.

Firstly, consider a case in which the terminal 362 and the terminal 363 are at high level. In this occasion, the collector potentials of the npn transistor 322 and the npn transistor 324 are at 0 and therefore, the emitter potentials of the npn transistor 321 and the npn transistor 323 are at 0 and no current flows in the resistor 337 and the resistor 340. Accordingly, the current flowing in the resistor 336 (resistance value $R_1$) is only $i_1$ supplied from the constant current source 357 and the potential observed at the output terminal of the U-phase terminal potential correcting circuit is a value of the input value of the terminal potential correcting circuit subtracted by the base-emitter voltage ($V_{be}$) of the transistor 320 and the resistance drop voltage in the resistor 336.

$$301a = U - V_{be} - R_1 \cdot i_1 \tag{1}$$

Consider a case where the terminal 362 and the terminal 363 are at low level. A potential of $V_{ir}$ is inputted to the terminal 361. At this occasion, the collector potentials of the npn transistor 322 and the npn transistor 324 are $V_{ir} + V_{be}$ (V) and therefore, the emitter potentials of the npn transistor 321 and the npn transistor 323 are $V_{ir}$ and currents of $V_{ir}/R_2$ flow in the resistor 337 (resistance value $R_2$) and the resistor 340 (resistance value $R_2$). Accordingly, the current flowing in the resistor 336 is $i_1$ supplied from the constant current source 357 added by the currents flowing in the resistor 337 and the resistor 340 and the potential observed at the output terminal of the U-phase terminal potential correcting circuit is as shown by the following equation (2).

$$301a = U - V_{be} - R_1 \cdot i_1 - 2 \cdot R_1 V_{ir}/R_2 \tag{2}$$

When the terminal 362 is at high level and the terminal 363 is at low level or when the terminal 362 is at low level and the terminal 363 is at high level, the current of $V_{ir}/R_2$ flows in either one of the resistor 337 and the resistor 340 and therefore, the potential observed at the output terminal of the U-phase terminal potential correcting circuit is as shown by the following equation (3).

$$301a = U - V_{be} - R_1 \cdot i_1 - R_1 \cdot V_{ir}/R_2 \tag{3}$$

Finally, in case where the voltage of the resistance drop is to be added (when currents flows as V→U, W→U), the terminal 362 and the terminal 363 are set at high level whereas in case where the voltage of the resistance drop is to be subtracted (when currents flow as U→V, U→W) the terminal 362 and the terminal 363 are set at low level by which the terminal potential can be corrected.

Further, in case where the U-phase is the nonconducting phase and the correction is not necessary (when currents flows V→W, W→V), the terminal 362 is set at high level and the terminal 363 is set at low level, or the terminal 362 is set at low level and the terminal 363 is set at high level. In a similar way, with regard to the V-phase, in case where the voltage of the resistance drop is to be added (when currents flow as U→V, W→V), the terminal 364 and the terminal 365 are set at high level. In case where the voltage of the resistance drop is to be subtracted (when currents flow as V→U, V→W), the terminal 364 and the terminal 365 are set at low level. In case where the correction is not necessary (when currents flow as U→W, W→U), the terminal 364 is set at high level and the terminal 365 is set at low level, or the terminal 364 is set at low level and the terminal 365 is set at high level.

Further, with regard to the W-phase, in case where the voltage of the resistance drop is to be added (when currents flow as U→W, V→W), the terminal 366 and the terminal 367 are set at high level. In case where the voltage of the resistance drop is to be subtracted (when currents flow as W→U, W→V), the terminal 366 and the terminal 367 are set at low level. In case where the correction is not necessary (when currents flow as U→V, V→U), the terminal 366 is set at high level and the terminal 367 is set at low level, or the terminal 366 is set at low level and the terminal 367 is set at high level. FIG. 11(b) shows the relationship among the conducting phase and the correction switch signals inputted to the terminals 362 through 367 as mentioned above summarizingly in timing charts.

Further, FIG. 11(a) shows a detailed circuit diagram of the specific correction switch signal forming circuit 316 for correcting the detected wiring terminal potentials by the integration of the product of resistance by current only during an actually driving period of time. In this embodiment switching signals shown in FIG. 11(b) are sent to the respective terminals 362 through 367 of the terminal potential correcting circuit 301 by combinations of the logical elements by using the drive signals 303a, 303b and 303c as the inputs.

Further, as shown in FIG. 6 in this embodiment, current control is performed on the wiring currents flowing in the armature by using a current control circuit 511, a buffer amplifier thereof 512, a resistor 513 and a driving transistor 514 and therefore, an output of the current control circuit 511 is utilized at the terminal 361 of the correcting circuit 301.

The current control circuit 511 detects an error between an actual rotation speed and an ordered rotation speed from a logical pulse signal 501 and controls the amounts of currents flowing in the armature windings such that the detected error is nullified.

Further, although the example of applying the invention to the three-phase brushless motor is described in this embodiment, it is apparent that the invention is applicable to all the brushless motors having a plurality of phases not limiting to the three-phase. Further, the means constituted by the transistor circuit in this embodiment may be constituted by a OP amplifier or a digital IC.

EMBODIMENT 4

Next, an explanation will be given of the construction and the operation of a unit which restarts stably in a short period of time even in case where a motor is stopped during operation for some cause and it is necessary to restart it.

Specifically, in restarting, the position signal of the rotor is detected from the winding potentials of the respective phases of the brushless motor, rising or falling edges of the position signal of the rotor are detected and selected to provide necessary edge signals and further a steady state rotation detecting circuit monitoring the rotation of the motor with combination of these signals, is provided. The edge signals are counted when abnormality is detected and the signals are rendered to be forcibly applied drive signals for the armature windings of the respective phases in restarting.

FIG. 13 shows a total construction diagram of a drive device of the three-phase brushless motor based on the above-mentioned way of thinking. The bridge circuit 311, the rotor position signal forming circuit 304, the counter circuit 307 and the pulse generating circuit 306 are the same those in the above-mentioned third embodiment and the explanation will be omitted. Numeral 565 designates a steady state rotation detecting circuit which compares the counter values 307a, 307b and 307c with the position signals 303a, 303b and 303c.

In this embodiment the position signals 303a, 303b and 303c are also inputted to the commutating circuit 309. In starting mode, the commutating circuit 309 outputs the drive signals 309a, 309b, 309c, 309d, 309e and 309f by a combination of the counter values 307a, 307b and 307c whereas in steady state rotation the circuit outputs the drive signals 309a, 309b, 309c, 309d, 309e and 309f by a combination of the position signals 303a, 303b and 303c. Further, the position signals 303a, 303b and 303c and the counter values 307a, 307b and 307c are also inputted to the steady state rotation detecting circuit 565. During steady state rotation the steady state rotation detecting circuit 565 compares the position signals 303a, 303b and 303c with the counter values 307a, 307b and 307c when a predetermined period of time elapses after the counter values have changed. FIG. 14 shows an example of a combination of theoretical logical relationships among the position signals 303a, 303b and 3030c and the counter values 307a, 307b and 307c. When an actual combination is not the combination as shown in FIG. 14, a restart pulse 565a is outputted. The restart pulse 565a is inputted to the commutating circuit 309.

An explanation will be given of an example in case where the rotor is stopped by some load in steady state rotation under such a construction in reference to FIG. 15. In FIG. 15, the rotor has been stopped since a time point (D). In this case, after a time period $t_1$ that is set in the pulse generating circuit 306 has elapsed since a pulse (01), a pseudo-pulse (p2) is outputted from the pulse generating circuit 306. The pseudo-pulse (p2) is outputted from a pulse selecting circuit 556, not shown, in the counter circuit 307 as a pulse (02) of a pulse series 307d and the counter values 307a, 307b and 307c are changed from LHL to LLH in view of an example of logical relationships in FIG. 16. As mentioned above during steady state rotation, the drive signals 309b, 309b, 309c, 309d, 309e and 309f are outputted by the combination of the position signals 303a, 303b and 303c and therefore, the conducting phase is not switched even if the counter values 307a, 307b and 307c are changed. Further, the steady state rotation detecting circuit 565 compares the position signals 303a, 303b and 303c with the counter values 307a, 307b and 307c after a predetermined time period $t_2$ has elapsed since the counter values 307a, 307b and 307c changed. In this case, the combination is not the theoretical combination in FIG. 14 and therefore, a restart pulse (q3) is outputted from the steady state rotation detecting circuit 565 and the mode of operation is shifted to the starting mode. As mentioned above in the starting mode, the drive signals 309a, 309b, 309c, 309d, 309e and 309f are outputted by the combination of the counter values 307a, 307b and 307c and therefore, the drive signals 309a, 309b, 309c, 309d, 309e and 309f becomes HHLLHL in view of FIG. 17, the current flowing is switched and the motor is normally rotated. Thereafter, the steady state rotation of the motor is performed as mentioned in the first embodiment and therefore, the current flowing is successively switched by the combination of the counter values 307a, 307b and 307c in accordance with the relationships shown in FIG. 17.

EMBODIMENT 5

Next, an explanation will be given of a motor drive circuit having a switch device from starting or restarting to steady state operation.

In this embodiment the switching is timewisely set and the operation is switched to steady state operation after a certain time period has elapsed.

FIG. 18 shows the total construction of a fifth embodiment of the present invention. The bridge circuit 311, the rotor position signal forming circuit 304, the counter circuit 307, the pulse generating circuit 306 and the steady state rotation detecting circuit 565 are the same as those in the above-mentioned third embodiment and fourth embodiment. Numeral 308 designates a switch signal generating circuit outputting a switch signal 308a for switching reference to either one of the counter values 307a, 307b and 307c and the position signals 303a, 303b and 303c when the commutating circuit 309 outputs the drive signals 309a, 309b, 309c, 309d, 309e and 309f. An explanation will be given of the switch signal generating circuit 308 as follows.

In this embodiment the motor rotation signal 305a and the restart pulse 565a are inputted to the switch signal generating circuit 308. The switch signal 308a is inputted to the commutating circuit 309.

FIG. 19 shows a structural view of the switch signal generating circuit 308 in this embodiment. In the embodiment the switch signal generating circuit 308 is constituted by a timer 570.

Next, an explanation will be given of the operation of the switch signal generating circuit 308 in this embodiment in reference to FIG. 20. In the embodiment when the motor rotation signal 305a inputted to the timer 570 is at H, the timer 570 is ON and the commutating circuit 309 outputs the drive signals 309a, 309b, 309c, 309d, 309e and 309f by the combination of the counter values 307a, 307b and 307c in accordance with the relationships shown in FIG. 17. Further, after a predetermined time period $t_0$ has elapsed, the switch signal 308a is changed from L to H and the commutating circuit 309 outputs the drive signals 309a, 309b, 309c, 309d, 309e and 309f by using the combination of the position signals 303a, 303b and 303c as shown in FIG. 17.

Further, when the restart pulse 565a outputted from the steady state rotation detecting circuit 565 is inputted when the commutating circuit 309 is outputting the drive signals 309a, 309b, 309c, 309d, 309e and 309f by the combination of the position signals 303a, 303b and 303c, the timer 570 is reset and the switch signal 308a is changed from the H to L. Thereby, the commutating circuit 309 outputs the drive signals 309a, 309b, 309c, 309d, 309e and 309f by using the counter values 307a, 307b and 307c. Further, the switch signal 308a is again changed from L to H after the predetermined time period $t_0$ and the commutating circuit 309 outputs the drive signals 309a, 309b, 309c, 309d, 309e and 309f by using the combination of the position signals 303a, 303b and 303c as shown in FIG. 17.

Although the switch signal 308a is set to L in case where the counter values 307a, 307b and 307c are referred and to H in case where the position signals 303a, 303b and 303c are referred in this embodiment, the setting may be reversed.

EMBODIMENT 6

FIG. 23 is a broken perspective view of essential portions of a flexible disk drive unit according to a sixth embodiment of the present invention and FIG. 24 is a partial sectional view showing an attaching state of a spindle motor.

In these drawings, numeral 601 designates a frame made by sheet metal pressing using an aluminum plate or the like of which section constituted by a bottom plate portion 611 and side wall portions 612 disposed at both sides thereof is substantially provided with a channel-like shape. Numeral 613 designates a bearing attaching hole for attaching a bearing 638 of a spindle motor 603.

The spindle motor 603 is a DC brushless motor and is provided with a type in which the inner peripheral portion is a rotor and the outer peripheral portion is a stator as shown in FIG. 23 and FIG. 24 or a type generally called "outer rotor type" in which the inner peripheral portion is the stator and the outer peripheral portion is the rotor as shown in FIG. 33 both of which are usable.

Explaining with regard to the former type, the spindle motor 603 is mainly constituted by a rotor 634 composed of a shaft 631, a hub 632 press-fitted to the shaft 631 and a ring-like magnet 633 fixed to the outer periphery of the hub 632 and having multiple magnetized portions, a stator 637 arranged around the rotor 634 in which drive coils 636 are wound around a stator yoke 635 in laminated layers made of a magnetic material, a bearing 638 supporting the shaft 631 and a cover 639 covering the stator 637. Further, in FIG. 23, numeral 604 designates a carriage mechanism and numeral 605 designates a main body substrate.

A bottom plate portion 611 of the frame 601 includes a stepped portion 614 and the spindle motor 603 is attached on a lower portion thereof. As shown in FIG. 23, a portion formed substantially in a circular shape is a motor attaching portion 615 formed thinly by subjecting it in a crushing step by a press in a series of pressing steps. Actually, in FIG. 24 only a ring-like portion for mounting the stator 637 is a thin wall portion 617.

As shown in FIG. 23 a plurality of distortion preventing holes 618 are previously punched out by a press before crushing to ensure the flatness of the thin wall portion 617 in crushing. In FIG. 23 the distortion preventing holes 618 are expressed by hatched portions to facilitate understanding. Further, numeral 619 designates beams in a radius direction to support a bearing attaching portion 616 in a circular shape. The shape, the arrangement etc. of the distortion preventing holes 618 will be mentioned later.

As shown in FIG. 24, in attaching the spindle motor 603, firstly the bearing 638 is vertically fixed on the bearing attaching portion 616. The bearing 638 is provided with a structure in which a thrust bearing 982 is attached to an outer periphery of a cylindrical member 981 and a stepped small diameter portion 983 is provided at an outer periphery of the cylindrical member 981. Accordingly, the bearing 638 can vertically be fixed on the bearing attaching portion 616 by inserting the stepped small diameter portion 983 into the bearing attaching hole 613 and thereafter calking an end portion 984 thereof. Next, the shaft 631 is press-fit and fixed to the rotor 634. Further, the shaft 631 is inserted into the fixed cylindrical member 981 by which the rotor 634 is supported by the thrust bearing 982. Then, the stator 637 is fixed on the thin wall portion 617 and finally the cover 639 is put over the stator 637.

In this way the spindle motor 603 can directly be attached on the frame 601.

In this embodiment an inexpensive frame and thinning of the unit are realized by the stepped portion 614 of the frame 601 made by sheet metal pressing and the thin wall portion 617 formed thinly by crushing by a press in a series of pressing steps. Further, the strength and the rigidity of the frame 601 are ensured since only the small hole 613 for attaching the bearing 638 is opened in the motor attaching portion 615. The distortion preventing holes 618 formed in the motor attaching portion 615 are provided to escape a wall thickness at the surrounding portions in crushing (distortion in crushing) and the flatness of the thin wall portion 617 can be ensured while ensuring the rigidity of the frame by the distortion preventing holes 618 thereby facilitating the pressing. Further, the attaching of the spindle motor 603 is extremely facilitated since the spindle motor 603 can be attached from one side of the frame 601.

EMBODIMENT 7

FIG. 25 is a sectional view of a frame according to a seventh embodiment of the present invention.

In this embodiment the motor attaching portion 615 is formed into the thin wall portion 617 by partially crushing only the upper face of the bottom plate portion 611 of the frame 601 by a crushing step whereby the lower face of the bottom plate portion 611 is made flat. In this embodiment the area of crushing is larger than that in the first embodiment and therefore, the shape, number and arrangement of the distortion escaping holes 618 are closely related to the flatness of the thin wall portion 617. An explanation will be given to the shape, number and arrangement of the distortion preventing holes 618 which are applicable to the sectional shapes of the frame 601 shown in the sixth embodiment and the seventh embodiment.

EMBODIMENT 8

FIG. 26 is a plane view of a motor attaching portion according to an eighth embodiment of the present invention.

In this embodiment distortion preventing holes 618 having a square shape are arranged in the circumferential direction at equal intervals. When the motor attaching portion 615 is crushed by a press, the wall thickness component of this portion is compressed and flows in a direction of reducing the distortion preventing holes 618 and therefore, the flatness of the thin wall portion 617 can be ensured. However, the distortion in the circumferential direction is larger than the distortion in the radius direction and therefore, it is necessary to determine the shape, number and arrangement of the distortion preventing holes 618 to considerably escape the distortion in the circumferential direction to highly ensure the accuracy of the frame.

EMBODIMENT 9

In this embodiment, as shown in FIG. 27 distortion preventing holes 618 are formed in a sector shape in arbitrary size and configuration and are radially arranged in the radius direction. Beams 619 supporting the bearing attaching portion 616 are also formed in a sector shape. The distortion in the circumferential direction in crushing can considerably be escaped by these distortion preventing holes 618 in a sector shape and therefore, the accuracy of the frame can be ensured.

EMBODIMENT 10

In this embodiment, as shown in FIG. 28, distortion preventing holes 618 in a sector shape are substantially symmetrically arranged with respect to an axis in a longitudinal direction of the frame 1 (axis in seek direction). Thereby, the left and right balance is provided and the rigidity of the total of the frame is stabilized.

EMBODIMENT 11

In this embodiment, as shown in FIG. 29, distortion preventing holes 618 in a sector shape are arranged substantially symmetrically with respect to the axis in the seek direction and a number of beams 619 is 12 or more. By rendering the number of the beams 619 to 12 or more, the area of the individual distortion preventing hole 618 can be reduced thereby further facilitating the ensuring of the rigidity in the total of the frame.

EMBODIMENT 12

In this embodiment, as shown in FIG. 30, a ratio of an inner peripheral dimension A to an outer peripheral dimension B of a beam 619 is determined as A:B=1:2. The distortion (elongation) at the outer peripheral portion of the beam 619 is larger than that of the inner peripheral portion and therefore, the accuracy of the frame is ensured by such a dimensional relationship without causing warp or wrinkle in the beams 619.

EMBODIMENT 13

In the embodiment, as shown in FIG. 31, second distortion preventing holes 620 are further provided outside of the outer peripheries of the beams 619. Each of the second distortion preventing holes 620 is concentrically arranged with respect to each of the beams 619, the shape thereof is in a substantially rectangular shape and the length thereof is almost equal to the dimension of the outer periphery of each of the beams 619. The distortion in the radius direction of the beams 619 can also be escaped by the second distortion preventing holes 620 and therefore, easy pressing can be realized while ensuring the accuracy and the rigidity of the frame.

EMBODIMENT 14

In this embodiment, as shown in FIG. 32, each of second distortion preventing holes 620 is extended at outer sides of the first distortion preventing holes 618 on the both sides of each of the beams 619. Further, when a dimension of an interval between the inner periphery 621 of the second distortion preventing holes 620 and the outer periphery 622 of the first distortion preventing hole 619 is determined as "t", an extension dimension at an extended portion of the second distortion preventing hole 620 between an end edge 623 of the extended portion and an end 624 of the outer periphery 622 of the beam 619 is 1.5 t (where t is a plate thickness of the frame). Thereby, the accuracy and the rigidity of the frame can further be ensured.

As has been explained, a flexible disk drive unit of the present invention is only provided with an extremely small attaching hole for erecting the bearing for the spindle motor on the frame and therefore, the strength and the rigidity of the frame can be enhanced and the ensuring of the accuracy of the frame is facilitated.

The frame and the motor base can be made a common member by providing the spindle motor of the sensorless drive type and the spindle motor can be attached directly to the frame from one side thereof by arranging the rotor, the hub and the stator on either one of the faces of the frame and therefore, the integrating operation of the spindle motor and the adjustment of the heights of the spindle motor and the magnetic heads are facilitated and further, the thinning of the unit can be realized.

The flatness of the frame is ensured and the perpendicularity of the motor shaft is easily and highly accurately provided by thinning the thickness of the motor attaching portion of the frame.

The bearing of the motor can be fixed and erected to the attaching hole of the frame by calking and therefore, the thickness of the motor attaching portion is thinned and the perpendicularity of the motor can easily and highly accurately be provided.

The drive circuit used in the spindle motor of the sensorless drive system does not utilize the neutral point and the position signal is provided by correcting by the correction determined by the wiring currents of the armature only during the actual drive period of time and therefore, few lead lines are provided and the correct drive timing with no phase lag can be determined.

The rising or falling edge signals of the position signal are selected and combined by counting them thereby forming the drive signal, in the no input period of time the counting is performed forcibly and the unit is restarted when the rotation is abnormal and therefore, the unit can be restarted even when the rotation is abnormal.

The switching between the starting or restarting and the steady state can be performed in a predetermined period of time and therefore, the operation can firmly be shifted to the steady state operation.

The switching between the starting or the restarting and the steady state can be performed by the counter values of the counter and therefore, the operation can firmly be shifted to the steady state operation.

The position signal to the counter is monitored and forcibly counted in the no input period of time, the unit is restarted when the rotation is abnormal and therefore, the unit can be restarted even when the rotation is abnormal.

As explained above, in the flexible disk drive device of the present invention, the frame is made by the sheet metal pressing, the bottom plate portion of the frame is partially crushed further to be thin, the spindle motor is directly attached to the thin wall portion and therefore, only a small attaching hole for the bearing of the spindle motor is opened at the thin wall portion and therefore, the strength, the rigidity and the flatness of the frame are ensured. Further, the conventional motor base is not necessary and the motor attaching portion is thinned and therefore, the unit can be thinned. Further, the spindle motor is directly attached to the frame from one side thereof and therefore, the integration of the spindle motor is facilitated.

The stepped portion is provided at the bottom plate portion of the frame and the thin motor attaching portion is provided at the lower portion and therefore, the unit can further be thinned.

The thin wall portion is confined only to the attaching portion of the stator of the spindle motor and therefore, the crushing is facilitated.

The distortion in the crushing can be escaped by the distortion preventing holes and therefore, the flatness and the dimensional accuracy of the thin wall portion (motor attaching portion) are further ensured.

The frame for the flexible disk drive unit of the present invention is made by the sheet metal pressing and therefore, an inexpensive frame can be provided while ensuring the accuracy (flatness, dimensional accuracy) of the frame.

The distortion preventing holes are arranged radially in the radius direction to minimize the lowering of the rigidity by the distortion preventing holes and therefore, facilitated pressing can be realized while ensuring the flatness and the rigidity.

The distortion preventing holes are arranged substantially symmetrically with respect to the axis in the seek direction and therefore, the balance is improved and the rigidity of the total of the frame is stabilized.

The number of the beams is 12 or more by which the area of the individual distortion preventing hole can be reduced and therefore, rigidity can further be ensured.

The ratio of the inner peripheral dimension to the outer peripheral dimension of the beam is determined to be 1 versus 2 and therefore, the accuracy of the frame can further be ensured.

The second distortion preventing holes are further provided outside of the outer peripheries of the beams whereby the distortion in the radius direction of the beams can be escaped by the second distortion preventing hole and therefore, the pressing can be facilitated while ensuring the accuracy and the rigidity of the frame.

The dimension of the interval between the inner periphery of the second distortion preventing hole and the outer periphery of the distortion preventing hole is defined as t and the extension dimension in the extended portion of the second distortion preventing hole between the edge of the second distortion preventing hole and the end of the outer periphery of the beam is rendered to be 1.5 t (where t is the plate thickness of the frame) and therefore, the accuracy and the rigidity of the frame can further be ensured.

We claim:

1. A flexible disk drive unit comprising:
    a frame constructed by pressing a piece of sheet metal to form a channel having side walls and to form a bottom plate portion having an inner bottom surface between the side walls and an outer bottom surface, the inner bottom surface having a raised portion and a motor attaching portion, the motor attaching portion being formed by pressing a part of the bottom plate portion such that the motor attaching portion is thinner than the raised portion, the motor attaching portion having a hole; and
    a spindle motor that rotates a magnetic disk, the spindle motor being in contact with the motor attaching portion of the inner bottom surface and secured to the outer bottom surface through the hole;
    wherein the motor attaching portion includes a plurality of distortion preventing holes that relieve stress when the motor attaching portion is pressed to prevent distortion of the bottom plate portion;
    the bottom plate portion includes a plurality of ribs, each of the ribs being defined by and located between two of the distortion preventing holes; and
    wherein both the holes and the ribs are formed around the motor attaching hole.

2. The flexible disk drive unit according to claim 1, wherein the plurality of distortion preventing holes are disposed with even intervals to each other.

3. The flexible disk drive unit according to claim 2, wherein the plurality of distortion preventing holes are disposed symmetrically to each other with respect to a line passing through the motor attaching hole.

4. The flexible disk drive unit according to claim 3, wherein the line passing through the motor attaching hole runs along an axis in a seek direction.

5. A flexible disk drive unit comprising:
    a frame constructed by pressing a piece of sheet metal to form a channel having side walls and to form a bottom plate portion having an inner bottom surface between the side walls and an outer bottom surface, the inner bottom surface having a raised portion and a motor attaching portion, the motor attaching portion being formed by pressing a part of the bottom plate portion such that the motor attaching portion is thinner than the raised portion, the motor attaching portion having a hole; and
    a spindle motor that rotates a magnetic disk, the spindle motor being in contact with the motor attaching portion of the inner bottom surface and secured to the outer bottom surface through the hole;
    wherein the motor attaching portion includes a plurality of distortion preventing holes that relieve stress when the motor attaching portion is pressed to prevent distortion of the bottom plate portion;
    wherein the bottom plate portion includes a plurality of radial ribs, each of the radial ribs being defined by and located between two of the distortion preventing holes;
    wherein the distortion preventing holes are disposed radially; and
    wherein both the holes and the ribs are formed around the motor attaching hole.

6. The flexible disk drive unit according to claim 5, wherein the spindle motor includes a stator attached to the motor attaching portion of the frame.

7. A flexible disk drive unit comprising:
    a frame constructed by pressing a piece of sheet metal to form a channel having side walls and to form a bottom plate portion having an inner bottom surface between the side walls and an outer bottom surface, the inner bottom surface having a raised portion and a motor attaching portion, the motor attaching portion being formed in a part of the bottom plate portion so that the motor attaching portion is thinner than the raised portion, the motor attaching portion having a hole; and
    a spindle motor that rotates a magnetic disk, the spindle motor being in contact with the motor attaching portion of the inner bottom surface and secured to the outer bottom surface through the hole, wherein
    the motor attaching portion includes a plurality of distortion preventing holes that relieve stress when the motor attaching hole is formed to prevent distortion of the bottom plate portion;
    the bottom plate portion includes a plurality of radial ribs, each of the radial ribs being defined by and located between two of the distortion preventing holes;
    the distortion preventing holes are disposed radially; and
    both the holes and the ribs are formed around the motor attaching hole.

* * * * *